(12) United States Patent
Hatakeyama et al.

(10) Patent No.: US 8,670,382 B2
(45) Date of Patent: Mar. 11, 2014

(54) CONTROL APPARATUS, WIRELESS COMMUNICATION APPARATUS, COMMUNICATION SYSTEM, AND CONTROL METHOD

(75) Inventors: Shinya Hatakeyama, Kawasaki (JP); Soichi Kato, Kawasaki (JP); Kiyohisa Hoshino, Kawasaki (JP); Takeshi Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 215 days.

(21) Appl. No.: 12/914,586

(22) Filed: Oct. 28, 2010

(65) Prior Publication Data

US 2011/0038316 A1 Feb. 17, 2011

Related U.S. Application Data

(63) Continuation of application No. PCT/JP2008/058428, filed on May 2, 2008.

(51) Int. Cl.
*H04W 4/00* (2009.01)
*H04L 12/28* (2006.01)
*H04W 36/00* (2009.01)
*H04B 7/00* (2006.01)

(52) U.S. Cl.
USPC ........ 370/328; 370/412; 455/422.1; 455/443; 455/524

(58) Field of Classification Search
None
See application file for complete search history.

(56) References Cited

U.S. PATENT DOCUMENTS

| 6,728,918 | B1 * | 4/2004 | Ikeda et al. ............ 714/748 |
| 7,180,896 | B1 * | 2/2007 | Okumura ............ 370/394 |
| 2005/0272366 | A1 * | 12/2005 | Eichinger et al. ........ 455/9 |
| 2006/0268885 | A1 * | 11/2006 | Varma ............ 370/394 |
| 2007/0237109 | A1 | 10/2007 | Iida et al. |
| 2007/0245204 | A1 | 10/2007 | Yomo et al. |
| 2008/0002656 | A1 | 1/2008 | Lundh et al. |
| 2008/0069044 | A1 | 3/2008 | Kimura et al. |

FOREIGN PATENT DOCUMENTS

| JP | 2006-086989 | 3/2006 |
| JP | 2007-536792 | 12/2007 |
| JP | 2008-072452 | 3/2008 |

OTHER PUBLICATIONS

International Search Report issued for corresponding International Patent Application No. PCT/JP2008/058428, mailed Jun. 17, 2008.
Extended European search report issued for corresponding application No. 08752333.8, dated Nov. 14, 2013.
Wiemann, Henning et al.; "A Novel Multi-Hop ARQ Concept"; Vehicular Technology Conference, vol. 5, pp. 3097-3101; May 30-Jun. 1, 2005.

* cited by examiner

*Primary Examiner* — Faruk Hamza
*Assistant Examiner* — Cassandra Decker
(74) *Attorney, Agent, or Firm* — Myers Wolin, LLC

(57) ABSTRACT

A mobile communication system has a mobile terminal, basestations, and a Radio Network Controller (RNC). In the case where drop of a frame occurs during data communication in Iub/Iur (between the basestations and the RNC), the RNC executes retransmission of an EDCH FP frame between the RNC and the basestations by transmitting a TN frame to the basestations to repair the drop of the frame without executing retransmission with the terminal device.

6 Claims, 18 Drawing Sheets

CONTROL APPARATUS, WIRELESS COMMUNICATION APPARATUS, COMMUNICATION SYSTEM, AND CONTROL METHOD

CROSS-REFERENCE TO RELATED APPLICATION

This application is a continuation of international application No. PCT/JP2008/058428 filed on May 2, 2008, now pending, the contents of which are herein wholly incorporated by reference.

FIELD

The embodiments discussed herein are directed to The present invention relates to a communication system or the like having a wireless communication apparatus performing wireless communication with a mobile terminal device and a control apparatus for executing data communication with the mobile terminal device via the wireless communication apparatus.

BACKGROUND

It is examined to apply the High-Speed Uplink Packet Access (HSUPA) to a mobile communication system of the Wideband-Code Division Multiple Access (W-CDMA) method in order to improve communication speed. The HSUPA is a function of providing an access in an uplink direction of a larger band (direction from a terminal to a network) in a mobile communication system.

In the following, after explanation of outline of a conventional mobile communication system, a protocol model of the HSUPA will be described. FIG. 16 is a diagram illustrating the configuration of a conventional mobile communication system. As illustrated in the diagram, the mobile communication system has a mobile terminal (UE) 10, basestations (Node B) 20 to 22, Radio Network Controllers (RNCs) 30 and 31, and a Core Network (CN) 40.

The intervals between the CN 40, the RNCs 30 and 31 and the basestations 20 and 21 are wires intervals, and intervals between the basestations 20 to 22 and the mobile terminal 10 are wireless intervals. The interface between the mobile terminal and the basestation is called Uu, the interface between the RNC and the basestation is called Iub, the interface between the RNC and the RNC is called Iur, and the interface between the CN and the RNC is called Iu.

In the mobile communication system of FIG. 16, when user data is received by the mobile terminal 10, the user data is transmitted to the RNC 30 accommodating the mobile terminal 10 via the CN 40. When the mobile terminal 10 presents in a cell 1, the RNC 30 transmits the user data to the basestation 20 accommodating the cell 1, and the basestation 20 transmits the user data to the mobile terminal. On the other hand, the user data transmitted from the mobile terminal 10 is received by any of the basestations 20 to 22, transmitted to the RNCs 30 and 31, and transmitted to the destination via the CN 40.

FIG. 17 is a diagram for explaining a protocol model of the HSUPA, and FIG. 18 is a diagram illustrating outline of data communication (Iub/Iur boundary). As illustrated in FIG. 17, a mobile terminal has layers of Application (APL), Radio Link Control (RLC; regarding RLC, refer to 3GPP TS25.322), Medium Access Control (MAC)-d, MAC-es, MAC-e, and physical layer (PHY), and a basestation has layers of MAC-e/Enhanced Dedicated Channel (EDCH) Frame Packet (FP) and PHY/TNL.

The RNC has a D-RNL (relay device) and an S-RNC. The D-RNC has a layer TNL/TNL, and the S-RNC has layers APL, RLC, MAC-d, MAC-es, EDCH FP, and TNL.

A data frame transmitted in the network direction (uplink direction) by the mobile terminal is divided in short Packet Data Unit (PDU) by the function of the PLD/MAC-es layer. After that, some MAC-d PDUs are multiplexed, there by constructing an MAC-es PDU (refer to the first to third stages in FIG. 18).

To the MAC-es PDU, a TSN as sequence number is given. In the HSUPA, by simultaneously performing the HARQ in a plurality of channels, the communication rate is improved. However, it is uncertain that data of which channel is received first. Consequently, the order of data received by the basestation is not assured. Due to this, when the mobile terminal transmits data frames, sequence numbers (TSN) are given on the MAC-es unit basis and, to assure order in the RNC, re-ordering is performed according to the TSNs.

Some more MAC-es PDUs are further multiplexed at the time of transmission from the basestation to an S-RNC and transmitted on the EDCH FP unit basis (EDCH FP frame) onto the Iub. Also to the EDCH FP frame, the FSN as a sequence number is given (refer to the fourth stage in FIG. 18).

FIG. 19 is a diagram illustrating an example of the data structure of the EDCH FP frame. As illustrated in the diagram, the EDCH FP frame has header and payload, and the header has various control information (not illustrated) and the FSN. The payload has a plurality of Mac-es PDUs, and each MAC-es PDU has a TSN.

On the other hand, on the S-RNC, the MAC-es PDU is extracted from the received EDCH FP frame, re-ordering is performed in accordance with the TSNs and, further, a process of reproducing a data frame is performed by terminating the MAC-d/RLC layer.

As described above, transmission on the Iub/Iur is performed on the EDCH FP unit basis. Consequently, when a cause of frame drop such as congestion of a line occurs on the Iub/Iur, the unit of the drop also becomes the EDCH FP unit.

Therefore, in the case where drop occurs on the Iub/Iur, it is repaired by retransmission by the RLC between the mobile terminal and the RNC. In a standard mobile communication system, the S-RNC has the function of detecting the drop by monitoring the FSN of the EDCH FP received, when drop is detected, regarding it as line congestion in the Iub/Iub, and notifies the basestation of the congestion indication (TNL congestion indication). The basestation which receives the congestion notification from the RNC side has the function of suppressing data transmission to the Iub/Iur by a predetermined amount or a predetermined period.

Japanese Laid-open Patent Publication No. 2006-86989 discloses a technique of improving throughput by waiting for an uplink retransmission packet only for predetermined time, transmitting a retransmission wait cancelling request to a wireless network control apparatus and, in the case where a retransmission wait cancellation response of instructing stop of retransmission waiting is received from the wireless network control apparatus, stopping the retransmission waiting.

However, in the case where a frame related to uplink traffic of the mobile communication system drops on the Iub/Iur, data communication has to be executed again between the RNC and the mobile terminal. Consequently, the conventional technique has a problem such that the band of the limited wireless interval is wasted.

In the case where the HSUPA is newly introduced in the form of expanding an existing W-CDMA system which is already operating, it is not easy to sufficiently assure the band of the Iub/Iur in relation with the existing system. The problem becomes more serious.

SUMMARY

According to an aspect of an embodiment of the invention, a control apparatus includes a detecting unit that, when receiving data transmitted from a mobile terminal device via a wireless communication apparatus including a buffer that stores at least one of the data in a predetermined capacity and the data for a predetermined time, detects drop of the data on the basis of sequence numbers included in the data and associated with predetermined data; and a data obtaining unit that, when drop of data is detected by the detecting unit, transmits the sequence number corresponding to the dropped data to the wireless communication apparatus and obtains the dropped data from the buffer of the wireless communication apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained in detail below with reference to accompanying drawings.

[a] First Embodiment

Figure 1:
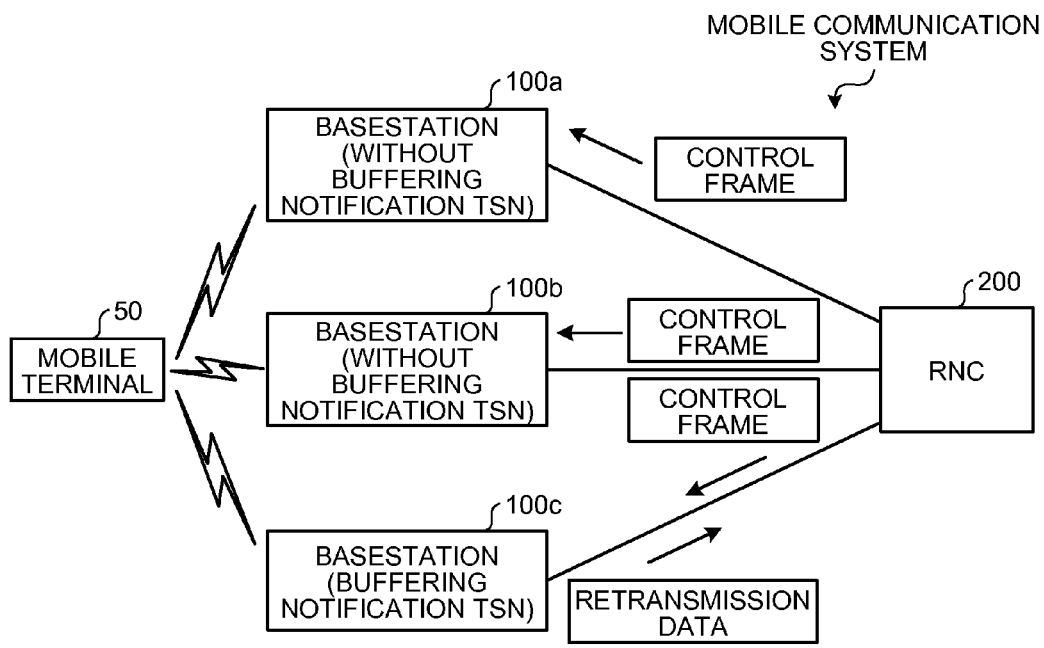
FIG. 1 is a diagram for explaining outline and characteristics of a mobile communication system according to a first embodiment.

First, the outline and characteristic of a mobile communication system according to a first embodiment will be described. FIG. 1 is a diagram for explaining the outline and characteristic of the mobile communication system according to the first embodiment. As illustrated in the diagram, the mobile communication system has a mobile terminal 50, basestations 100a to 100c, and a Radio Network Controller (RNC) 200.

The intervals between the RNC 200 and the basestations 100a to 100c are wired intervals, and the intervals between the basestations 100a to 100c and the mobile terminal 50 are wireless intervals. The interface between the mobile terminal and the basestations will be called as Uu, and the interface between the RNC and the basestations will be called Iub/Iur.

Figure 18:
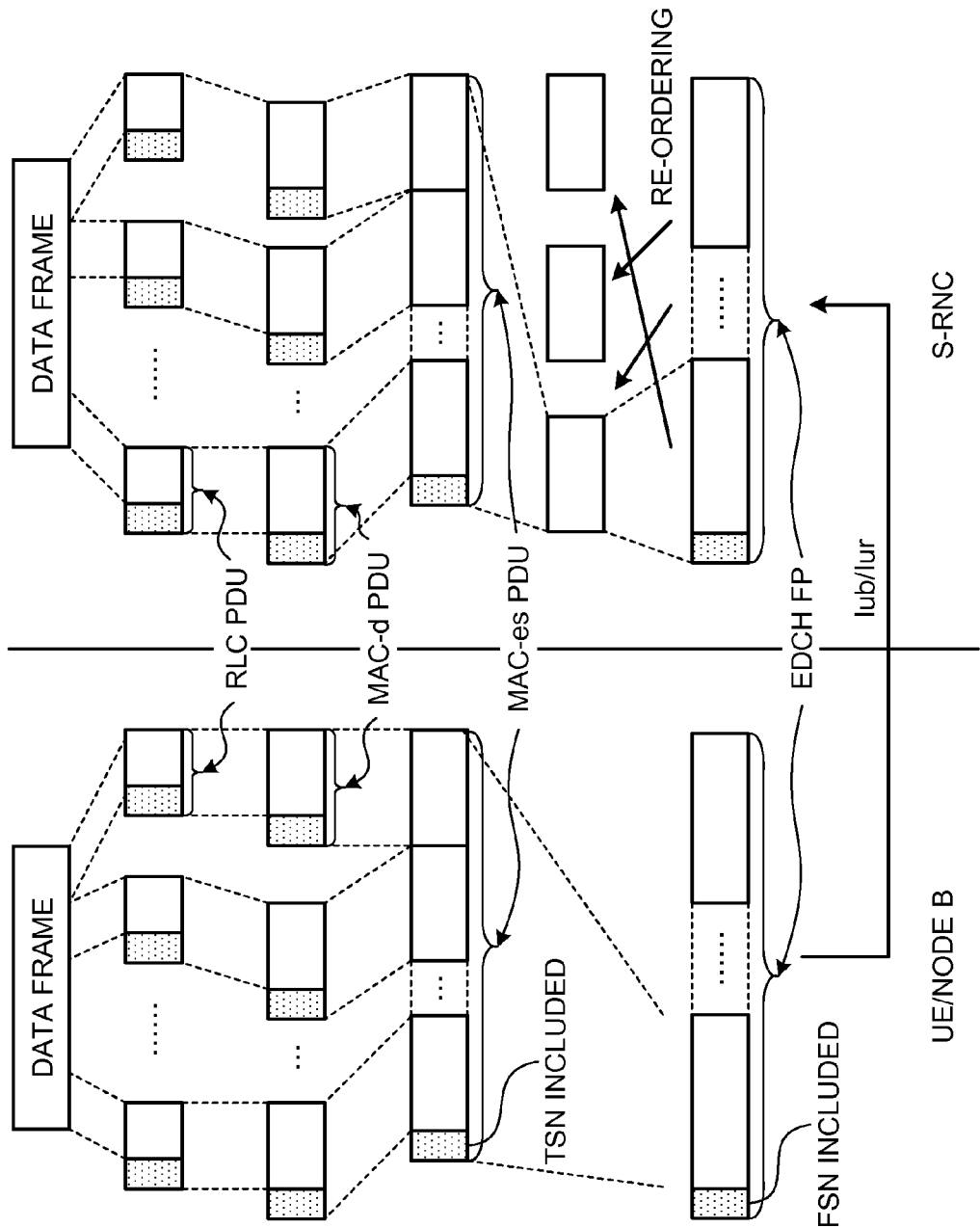
FIG. 18 is a diagram illustrating outline of data communication (Iub/Iur boundary)

The mobile terminal 50 is an apparatus for executing transmission/reception of frames (frames include various control data, sound, images, data, and the like) to/from another mobile terminal (not illustrated) by using the mobile communication system. In particular, as a technique related to the present invention, in the case of transmitting a frame (MAC-es PDU) to the basestations 100a to 100c, the mobile terminal 50 assigns Transport Sequence Number (TSN) (refer to FIG. 18). The TSN is a sequence number indicative of the order of each frame. It is assumed that the TSN is given in the frame (MAC-es PDU) unit basis by the mobile terminal 50.

The basestation 100a is an apparatus for relaying data communication executed between the mobile terminal 50 and the RNC 200. In particular, as a technique related to the present invention, in the case of receiving a frame (MAC-es PDU) from the mobile terminal 50, the basestation 100a generates an EDCH FP frame obtained by multiplexing frames and assigns Forward Sequence Number (FSN) to the generated EDCH FP frame. The FSN is a sequence number indicative of the order of the each FP frame.

The basestation 100a transmits the generated EDCH FP frame to the RNC 200 and buffers the EDCH FP frame by a predetermined amount or for predetermined time. Since description on the basestations 100b and 100c is similar to the description on the basestation 100a.

The RNC 200 is an apparatus for executing data communication with the mobile terminal 50 via the basestations 100a to 100c. In particular, as a technique related to the present invention, in the case of receiving the EDCH FP frame from the basestations 100a to 100c, the RNC 200 monitors the TSN included in the EDCH FP frame, and detects drop of the TSN.

In the case where drop of the TSN is detected, the RNC 200 transmits a control frame including the information of the TSN whose drop is detected to the basestations 100a to 100c. The basestations 100a to 100c which receive the control frame determine whether a frame corresponding to the TSN presents in the EDCH FP frames buffered. In the case where the frame presents, an EDCH FP frame including the TSN is retransmitted to the RNC 200.

For example, in FIG. 1, in the case where a frame corresponding to the TSN exits in the basestation 100c, the basestation 100c retransmits an EDCH FP frame including the TSN to the RNC 200.

Figure 2:
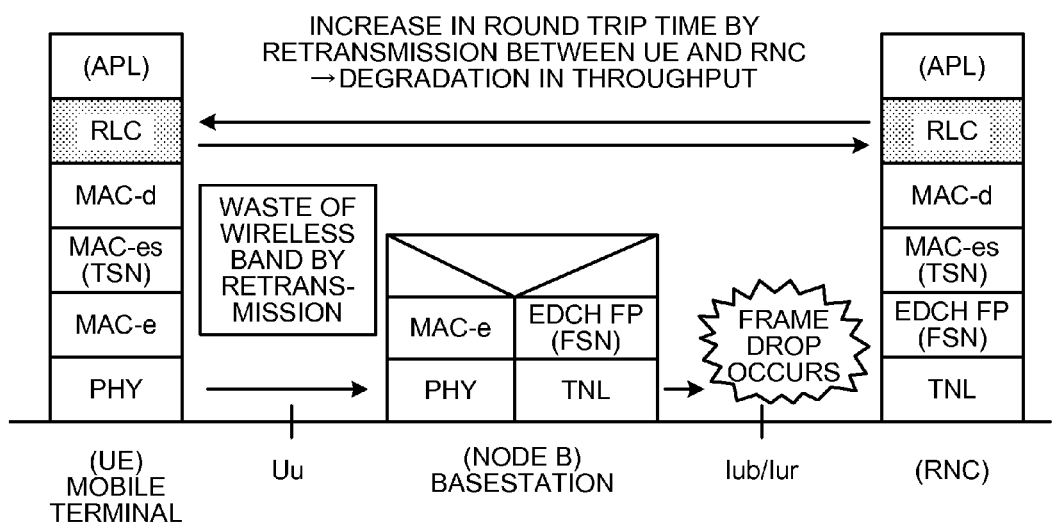
FIG. 2 is a diagram illustrating processes performed at the time of retransmission of a conventional mobile communication system.
Figure 3:
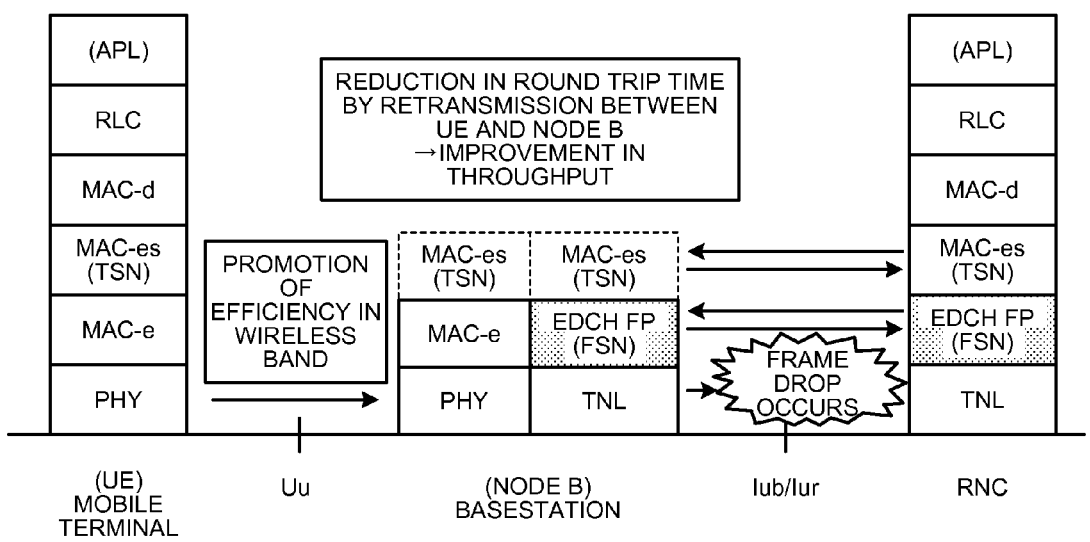
FIG. 3 is a diagram illustrating processes performed at the time of retransmission of a mobile communication system of the present invention.

An effect of the mobile communication system illustrated in the first embodiment will be described in comparison with the conventional technique. FIG. 2 is a diagram illustrating processes at the time of retransmission of the conventional mobile communication system. FIG. 3 is a diagram illustrating processes at the time of retransmission of the mobile communication system of the invention.

As illustrated in FIG. 2, even in the case where drop of a frame occurs in the Iub/Iur (between the basestation and the RNC) in the conventional technique, the drop of the frame is solved by the function of an RLC layer. Specifically, since drop is repaired by retransmission between the mobile terminal and the RNC, a problem occurs such that the band in the wireless interval (between the mobile terminal and the basestation) is wasted, and it causes increase in roundtrip time (throughput degradation).

On the other hand, in the mobile communication system according to the first embodiment, as illustrated in FIG. 3, in the case where drop of a frame occurs in the Iub/Iur (between the basestation and the RNC), by executing retransmission of the EDCH FP frame between the RNC and the basestation, the drop is repaired. Therefore, an effect that the efficiency of use of the wireless band improves is obtained and, simultaneously, since retransmission traffic is performed not via the wireless interval having large propagation delay, an effect such that the roundtrip time becomes shorter as compared with that in the case of retransmission performed in the RLC layer is obtained.

Figure 4:
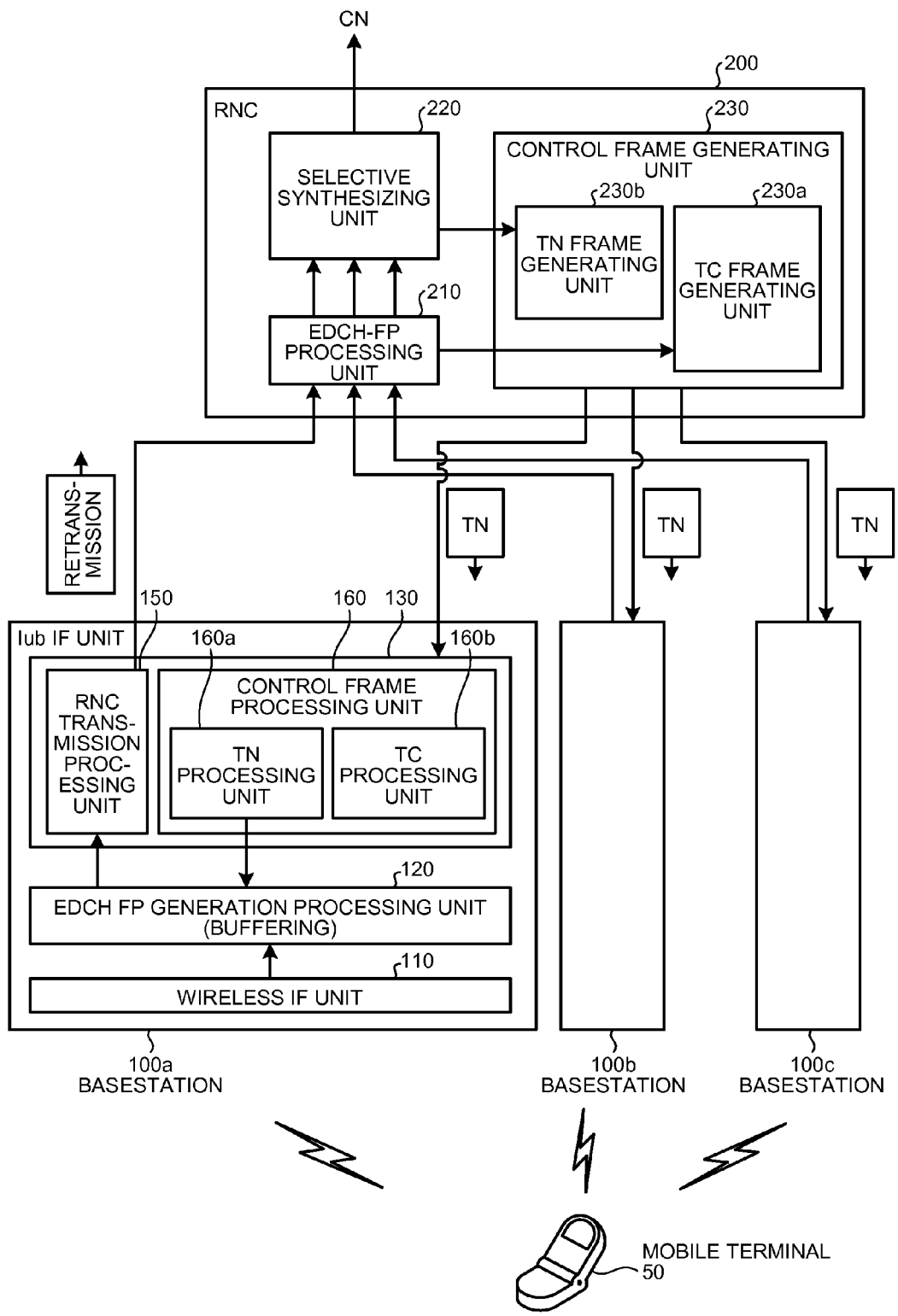
FIG. 4 is a functional block diagram illustrating the configuration of a basestation and an RNC in the first embodiment.

Next, the configuration of the basestation 100a and the RNC 200 illustrated in FIG. 1 will be described. FIG. 4 is a functional block diagram illustrating the configuration of the basestation 100a and the RNC 200 according to the first embodiment. Since the configuration of the basestations 100b and 100c is similar to that of the basestation 100a, the description will not be repeated.

First, the configuration of the basestation 100a will be described. The basestation 100a has a wireless IF unit 110, an EDCH FP generation processing unit 120, and an Iub IF unit 130. Since the other components are similar to those of a known basestation, their description will not be given.

The wireless IF unit 110 is means for controlling wireless data communication with the mobile terminal 50. In the case where a frame (MAC-es PDU) is received from the mobile terminal 50, the wireless IF unit 110 outputs the received frame to the EDCH FP generation processing unit 120. It is assumed that the TSN as a sequence number is given to each frame. In the case where a frame addressed to the mobile terminal 50 is obtained, the wireless IF unit 110 transmits the obtained frame to the mobile terminal 50.

Figure 19:
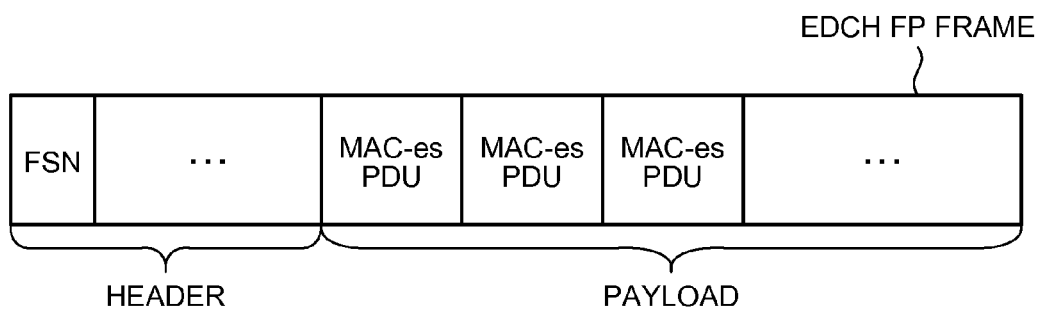
FIG. 19 is a diagram illustrating an example of the data structure of an EDCH FP frame.

The EDCH FP generation processing unit 120 is means for generating an EDCH FP frame obtained by multiplexing frames in the case where a frame is obtained by the wireless IF unit 110. In the case of generating an EDCH FP frame, the EDCH FP generation processing unit 120 gives the FSN (for the data structure of the EDCH FP frame, refer to FIG. 19).

The EDCH FP generation processing unit 120 stores the generated EDCH FP frame in its buffer and outputs the EDCH FP frame to the Iub IF unit 130. The EDCH FP generation processing unit 120 stores the EDCH FP frame until predetermined time elapses since the EDCH FP frame is stored. Alternately, the EDCH FP generation processing unit 120 may store the EDCH FP frame up to predetermined capacity and, when there is no remaining capacity in the buffer, sequentially erase the EDCH FP frames from the oldest one.

When the TSN is obtained from a TN processing unit 160a (explanation of TN processing unit 160a will be described later), the EDCH FP generation processing unit 120 compares the obtained TSN with a TSN included in an EDCH FP frame stored in its buffer to detect the matching TSN, and detects each frame (MAC-es PDU) associated with the detected TSN.

The EDCH FP generation processing unit 120 generates an EDCH FP frame obtained by multiplexing the detected frames and outputs the generated EDCH FP frame to a RNC transmission processing unit 150 so as to retransmit it to the RNC 200.

The Iub IF unit 130 is means for controlling data communication with the RNC 200. The Iub IF unit 130 has the RNC transmission processing unit 150 and a control frame processing unit 160.

The RNC transmission processing unit 150 is means for transmitting the obtained EDCH FP frame to the RNC 200 when the EDCH FP frame is obtained from the EDCH FP generation processing unit 120.

The control frame processing unit 160 is means for executing various processes on the basis of control frames (TN frame and TC frame) transmitted from the RNC 200 and has the TN processing unit 160a and a TC processing unit 160b.

The TC frame is a control frame transmitted from the RNC 200 when drop of an EDCH FP frame is detected by the RNC 200. On the other hand, the TN frame is a control frame transmitted from the RNC 200 in the case where drop of a frame (MAC-es PDU) is detected by the RNC 200. The TN frame includes a TSN corresponding to a dropped frame.

Figure 5:
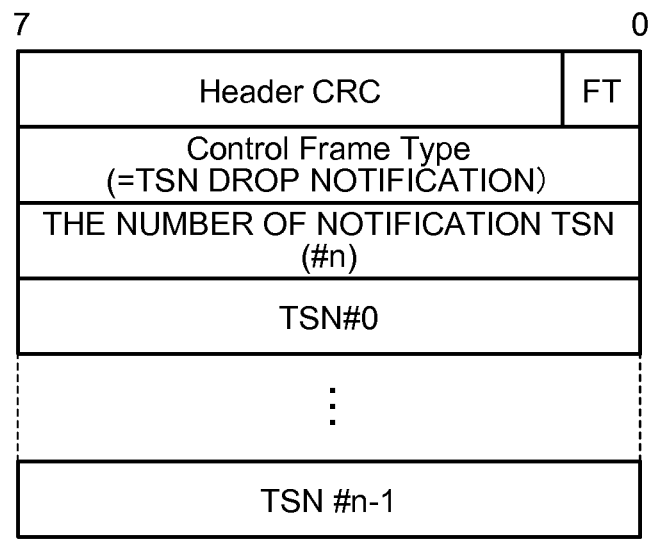
FIG. 5 is a diagram illustrating an example of data structure of a TN frame.

FIG. 5 is a diagram illustrating an example of the data structure of the TN frame. As illustrated in the diagram, the TN frame has header CRC, FT, control frame type, the number of notification TSNs, and TSN #0 to #n−1. "Control frame type" includes information for notifying of drop of a frame (TSN drop), and "the number of notification TSNs" indicates the number of TSNs whose drop is detected (the number of dropped frames). For example, in the case where "n" dropped frames present, the number of notification TSNs is "n". In TSN#0 to TSN#n−1, the number of TSNs associated with the dropped frames are registered.

The TN processing unit 160a is means for outputting a TSN notified in a TN frame which is received from the RNC 200 to the EDCH FP generation processing unit 120. The TN processing unit 160b is means for suppressing data communication from the basestation 100a to the RNC 200 by predetermined amount or for a predetermined period when a TC frame (congestion notification) is received from the RNC 200.

Subsequently, the configuration of the RNC 200 will be described. As illustrated in FIG. 4, the RNC 200 has an EDCH-FP processing unit 210, a selective synthesizing unit 220, and a control frame generating unit 230.

The EDCH-FP processing unit 210 is means for controlling data communication with the basestations 100a to 100c and, in the case where an EDCH FP frame is received from the basestations 100a to 100c, outputs the received EDCH FP frame to the selective synthesizing unit 220.

The EDCH-FP processing unit 210 monitors an FSN included in the EDCH FP frame and, in the case where drop of an FSN is detected, outputs information indicative of the detection of an FNS drop to the control frame generating unit 230.

The selective synthesizing unit 220 is means, when the EDCH FP frames are obtained, for synthesizing the frames by re-ordering the frames associated with the TSNs on the basis of the TSNs included in the EDCH FP frames. The selective synthesizing unit 220 outputs the synthesized frame to the CN.

The selective synthesizing unit 220 determines whether drop of a TSN presents on the basis of the TSNs associated with the frames and, in the case where drop of a TSN is detected, outputs information of the dropped TSN to the control frame generating unit 230. For example, in the case where the TSNs in the frames are "1", "2", "4", and "5", the selective synthesizing unit 220 determines that the TSN of "3" drops (is missing) and outputs the information of the TSN "3" to the control frame generating unit 230.

The control frame generating unit 230 is means for generating control frames (TN frame and TC frame) on the basis of detection results of the EDCH-FP processing unit 210 and the selective synthesizing unit 220, and has a TC frame generating unit 230a and a TN frame generating unit 230b.

The TC frame generating unit 230a is means, in the case where information indicating that drop of an FSN is detected is obtained from the EDCH-FP processing unit 210, for generating a TC frame (congestion notification), and transmitting the generated TC frame to the basestations 100a to 100c.

The TN frame generating unit 230b is means, in the case where information of the dropped TSN is obtained from the selective synthesizing unit 220, for generating a TN frame (refer to FIG. 5) including the information of the dropped TSN and transmitting the generated TN frame to the basestations 100a to 100c.

The TN frame transmitted from the TN frame generating unit 230b is used, for example, by defining a frame obtained by expanding "control frame type" of "control frame" defined in 3rd Generation Partnership Projection (3GPP). The information of the TSN notified by the TN frame is defined so that it can be notified in the list format.

Figure 6:
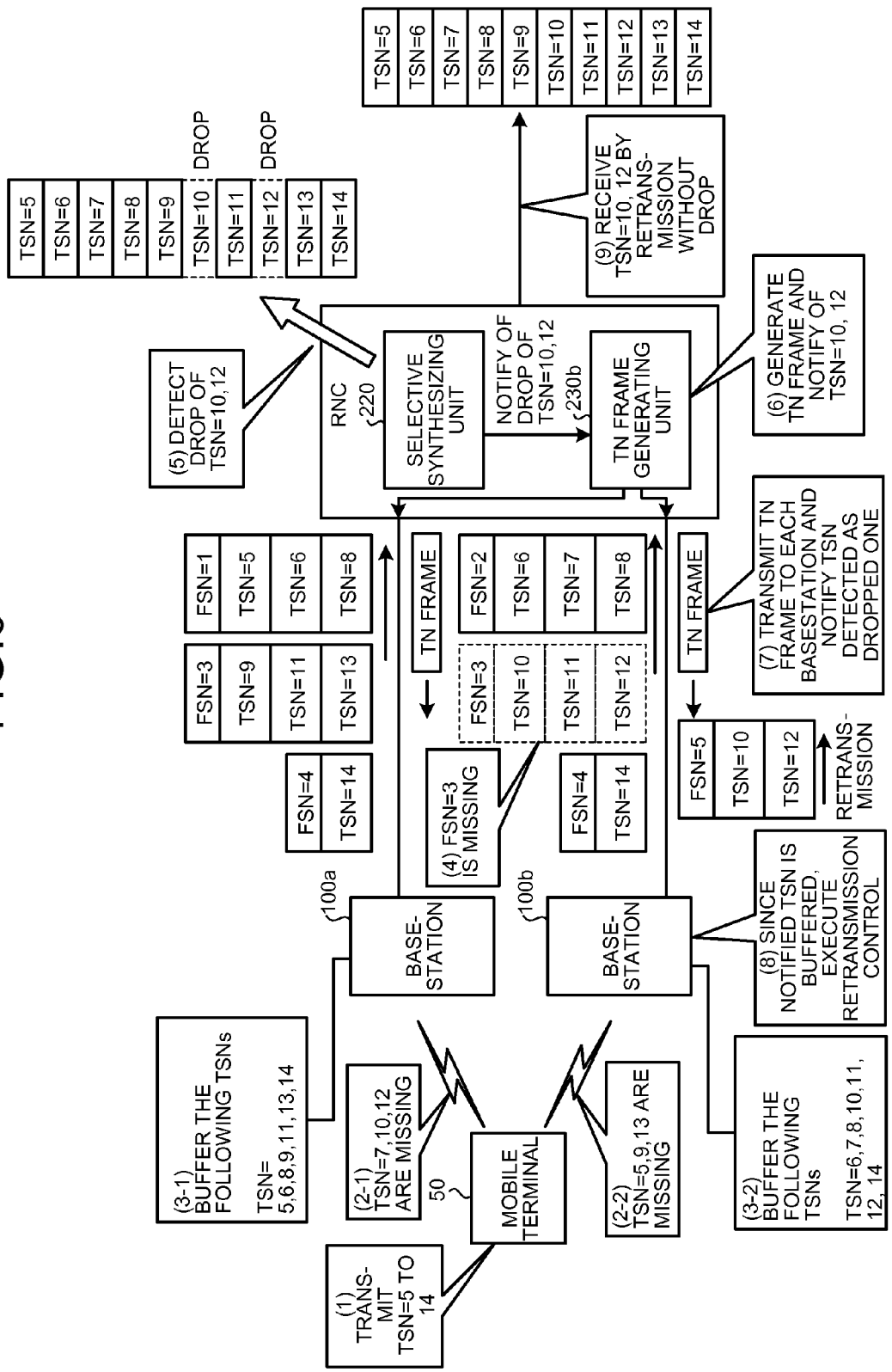
FIG. 6 is a diagram illustrating an operation example of the mobile communication system according to the first embodiment.

Next, an operation example of the mobile communication system according to the first embodiment will be described. FIG. 6 is a diagram illustrating an operation example of the mobile communication system according to the first embodiment. As illustrated in FIG. 6, the mobile terminal 50 transmits frames of TSN=5 to 14 to the basestations 100a and 100b (refer to (1) in FIG. 6).

The basestation 100a receives frames of TSN=5, 6, 8, 9, 11, 13, and 14 (frames of TSN=7, 10, and 12 drop) (refer to (2-1) in FIG. 6) and buffers the frames of TSN=5, 6, 8, 9, 11, 13, and 14 (refer to (3-1) in FIG. 6).

The basestation 100b receives frames of TSN=6, 7, 8, 10, 11, 12, and 14 (frames of TSN=5, 9, and 13 drop) (refer to (2-2) in FIG. 6) and buffers the frames of TSN=6, 7, 8, 10, 11, 12, and 14 (refer to (3-2) in FIG. 6).

The basestation 100a transmits an EDCH FP frame (FSN=1) obtained by multiplexing frames of TSN=5, 6, and 8, an EDCH FP frame (FSN=3) obtained by multiplexing frames of TSN=9, 11, and 13, and an EDCH FP frame (FSN=4) including TSN=14 to the RNC 200.

The basestation 100b transmits an EDCH FP frame (FSN=2) obtained by multiplexing frames of TSN=6, 7, and 8, an EDCH FP frame (FSN=3) obtained by multiplexing frames of TSN=10, 11, and 12, and an EDCH FP frame (FSN=4) including TSN=14 to the RNC 200. It is assumed that drop of the EDCH FP frame of FSN=3 occurs (refer to (4) in FIG. 6).

The RNC 200 receives the EDCH FP frames from the basestations 100a and 100b, and the selective synthesizing unit 220 detects drop of the TSN on the basis of the TSN included in the EDCH FP frames (refer to (5) in FIG. 6). In this case, TSN =10 and 12 out of TSN=5 to 14 are not included, so that the selective synthesizing unit 220 notifies the TN frame generating unit 230b of the drop of the TSN=10 and 12.

The TN frame generating unit 230b generates a TN frame and notifies the basestations 100a and 100b of TSN=10 and 12 (refer to (6) and (7) in FIG. 6). Since the corresponding frames of TSN=10 and 12 are stored in a storage unit of the basestation 100b, the basestation 100b retransmits an EDCH FP frame (FSN=5) obtained by multiplexing the frames of TSN=10 and 12 to the RNC 200 (refer to (8) in FIG. 6). The RNC 200 receives the EDCH FP frame (FSN=5) retransmitted from the basestation 100b, thereby repairing the frame drop (refer to (9) in FIG. 6).

Figure 7:
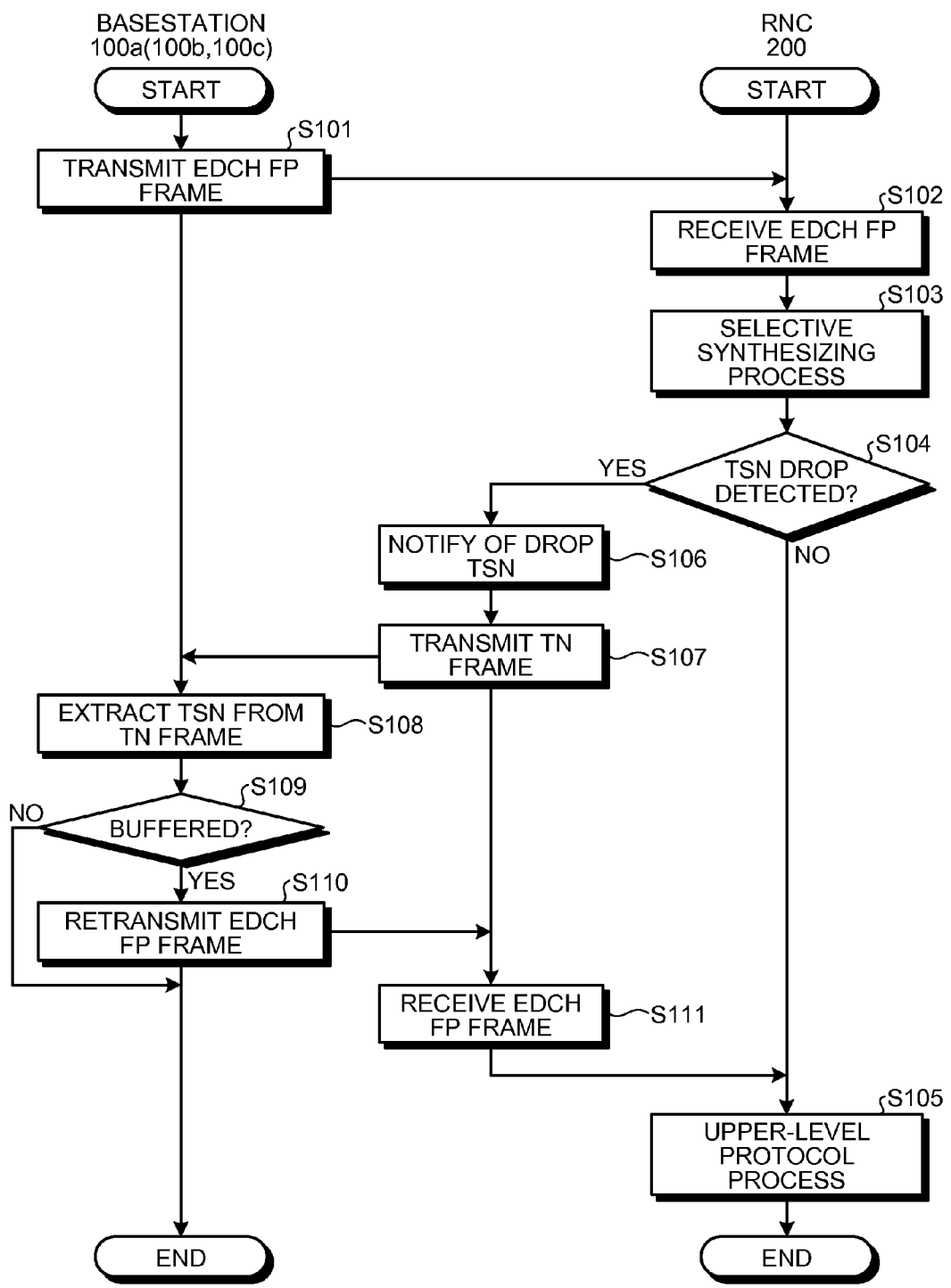
FIG. 7 is a flowchart illustrating a procedure of the mobile communication system according to the first embodiment.

Next, the procedure of the mobile communication system according to the first embodiment will be described. FIG. 7 is a flowchart illustrating the procedure of the mobile communication system according to the first embodiment. For convenience of explanation, the procedure of data communication between the basestation 100a and the RNC 200 will be described.

As illustrated in FIG. 7, the basestation 100a transmits the EDCH FP frame to the RNC 200 (step S101), and the RNC 200 receives the EDCH FP frame (step S102) and executes selective synthesizing process (step S103).

In the case where no drop of a TSN is detected (No in step S104), an upper-level protocol process is executed (step S105). On the other hand, in the case where drop of a TSN is detected (Yes in step S104), the TSN detected as dropped one is notified to the TN frame generating unit 230b (step S106), and the TN frame is transmitted to the basestation 100a (and the basestations 100b and 100c) (step S107).

The basestation 100a extracts a TSN from a TN frame (step S108) and determines whether the TSN is buffered. In the case where the TSN is not buffered (No in step S109), the basestation 100a finishes the process.

On the other hand, in the case where the TSN is buffered (Yes in step S109), the basestation 100a retransmits the EDCH FP frame to the RNC 200 (step S110). The RNC 200 receives the EDCH FP frame (step S111) and shifts to step S105.

As described above, in the mobile communication system according to the first embodiment, in the case where drop of a frame occurs in the Iub/Iur (between the basestations 100a to 100c and the RNC 200), the RNC 200 transmits a TN frame to the basestations 100a and 100b, thereby executing retransmission of the EDCH FP frame between the RNC and the basestation to repair the drop. Therefore, an effect that the use efficiency of the wireless band improves is obtained. Simultaneously, retransmission traffic is performed not via a wireless interval having large propagation delay. Consequently, an effect such that the roundtrip time becomes shorter as compared with that in the case of retransmission performed in the RLC layer is obtained.

In the mobile communication system according to the first embodiment, when drop of a frame occurs, the RNC 200 outputs a TN frame to the basestations 100a to 100c, so that probability of obtaining a frame corresponding to the dropped TSN can be improved (it is sufficient that any one of the basestations 100a to 100c holds the frame of the TSN).

[b] Second Embodiment

Figure 8:
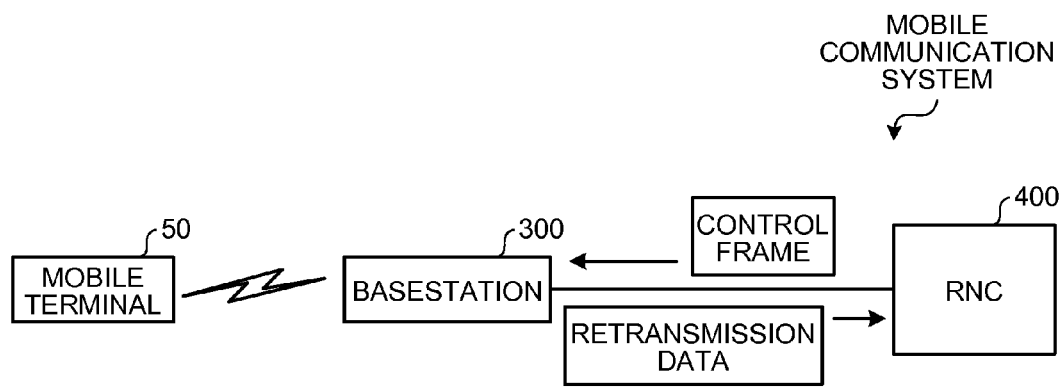
FIG. 8 is a diagram for explaining outline and characteristic of a mobile communication system according to a second embodiment.

Next, the outline and characteristic of a mobile communication system according to a second embodiment will be described. FIG. 8 is a diagram for explaining the outline and characteristic of the mobile communication system according to the second embodiment. As illustrated in the diagram, the mobile communication system has the mobile terminal 50, a basestation 300, and an RNC 400.

The interval between the RNC 400 and the basestation 300 is a wired interval, and the interval between the basestation 300 and the mobile terminal 50 is a wireless interval. The interface between the mobile terminal and the basestation will be called as Uu, and the interface between the RNC and the basestation will be called Iub/Iur.

Since description on the mobile terminal 50 is similar to that of the mobile terminal 50 in FIG. 1, the same reference numeral is designated and description will not be repeated.

The basestation 300 is an apparatus for relaying data communication executed between the mobile terminal 50 and the RNC 400. In particular, as a technique related to the present invention, in the case where a frame (frame on the MAC-es PDU unit) is received from the mobile terminal 50, the basestation 300 generates an EDCH FP frame obtained by multiplexing frames, and designates Forward Sequence Number (FSN) to the generated EDCH FP frame.

The FSN is a sequence number indicative of the order of the EDCH FP frames. The basestation 300 transmits the generated EDCH FP frame to the RNC 400 and buffers the EDCH FP frame by a predetermined amount or for predetermined time.

The RNC 200 is an apparatus for executing data communication with the mobile terminal 50 via the basestation 300. In particular, as a technique related to the present invention, in the case of receiving the EDCH FP frame from the basestation 300, the RNC 400 monitors the FSN included in the EDCH FP frame, and detects drop of the FSN.

In the case where drop of the FSN is detected, the RNC 200 transmits a control frame including the information of the FSN whose drop is detected to the basestation 300. The basestation 300 which receives the control frame determines whether an EDCH FP frame corresponding to the FSN presents in the EDCH FP frames buffered. In the case where the frame presents, an EDCH FP frame including the FSN is retransmitted to the RNC 400.

As described above, in the mobile communication system according to the second embodiment, in the case where drop of an EDCH FP frame occurs in Iub/Iur (between the basestation and the RNC), by executing retransmission of the EDCH FP frame between the RNC and the basestation, the drop is repaired. Therefore, an effect that the efficiency of use of the wireless band improves is obtained and, simultaneously, since retransmission traffic is performed not via the wireless interval having large propagation delay, an effect such that the roundtrip time becomes shorter as compared with that in the case of retransmission performed in the RLC layer is obtained.

Figure 9:
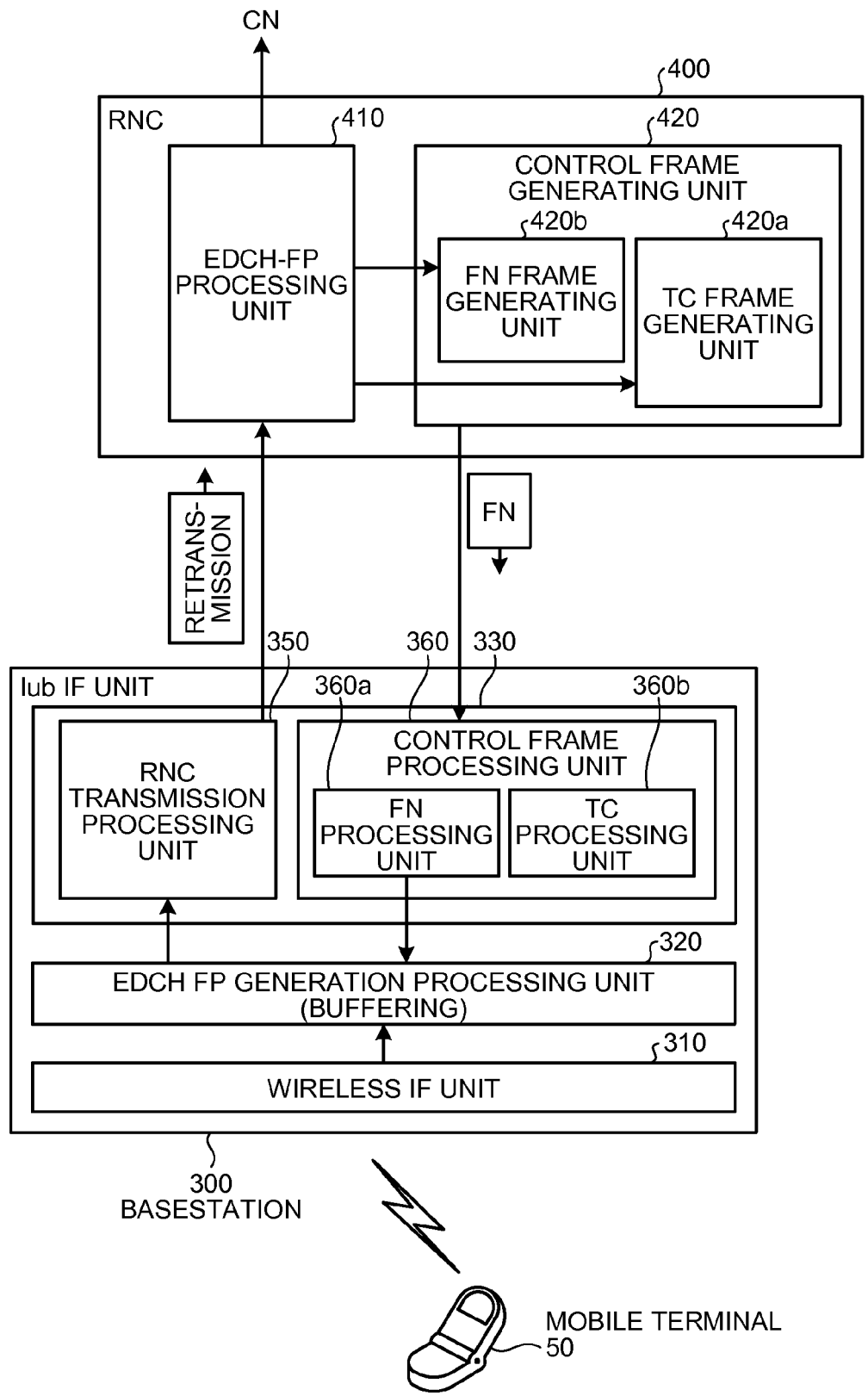
FIG. 9 is a functional block diagram illustrating the configuration of a basestation and an RNC in the second embodiment.

Next, the configuration of the basestation 300 and the RNC 400 illustrated in FIG. 8 will be described. FIG. 9 is a functional block diagram illustrating the configuration of the basestation 300 and the RNC 400 according to the second embodiment.

First, the configuration of the basestation 300 will be described. The basestation 300 has a wireless IF unit 310, an EDCH FP generation processing unit 320, and an Iub IF unit 330. Since the other components are similar to those of a known basestation, their description will not be given.

The wireless IF unit 310 is means for controlling wireless data communication with the mobile terminal 50. In the case where a frame (MAC-es PDU) is received from the mobile terminal 50, the wireless IF unit 310 outputs the received frame to the EDCH FP generation processing unit 320. In the case where a frame addressed to the mobile terminal 50 is obtained, the wireless IF unit 310 transmits the obtained frame to the mobile terminal 50.

The EDCH FP generation processing unit 320 is means for generating an EDCH FP frame obtained by multiplexing frames in the case where a frame is obtained from the wireless IF unit 310. In the case of generating an EDCH FP frame, the EDCH FP generation processing unit 320 gives the FSN (for the data structure of the EDCH FP frame, refer to FIG. 19).

The EDCH FP generation processing unit 320 stores the generated EDCH FP frame in its buffer and outputs the EDCH FP frame to the Iub IF unit 330. The EDCH FP generation processing unit 320 stores the EDCH FP frame until predetermined time elapses since the EDCH FP frame is stored. Alternately, the EDCH FP generation processing unit 320 may store the EDCH FP frame up to predetermined capacity and, when there is no remaining capacity in the buffer, sequentially erase the EDCH FP frames from the oldest one.

When the FSN is obtained from an FN processing unit 360*a* (explanation of FN processing unit 360*a* will be described later), the EDCH FP generation processing unit 320 compares the obtained FSN with an FSN included in an EDCH FP frame stored in its buffer to detect the matching FSN, and detects an EDCH FP frame associated with the detected FSN. The EDCH FP generation processing unit 320 outputs the detected EDCH FP frame to an RNC transmission processing unit 350 so as to retransmit it to the RNC 400.

The Iub IF unit 330 is means for controlling data communication with the RNC 400. The Iub IF unit 330 has an RNC transmission processing unit 350 and a control frame processing unit 360.

The RNC transmission processing unit 350 is means for transmitting the obtained EDCH FP frame to the RNC 400 when the EDCH FP frame is obtained from the EDCH FP generation processing unit 320.

The control frame processing unit 360 is means for executing various processes on the basis of control frames (FN frame and TC frame) transmitted from the RNC 400 and has an FN processing unit 360*a* and a TC processing unit 360*b*.

The TC frame is a control frame transmitted from the RNC 400 when drop of an EDCH FP frame is detected by the RNC 400. On the other hand, the FN frame is a control frame transmitted from the RNC 400 in the case where drop of an EDCH FP frame is detected by the RNC 400. The FN frame includes an FSN corresponding to a dropped EDCH FP frame.

Figure 10:
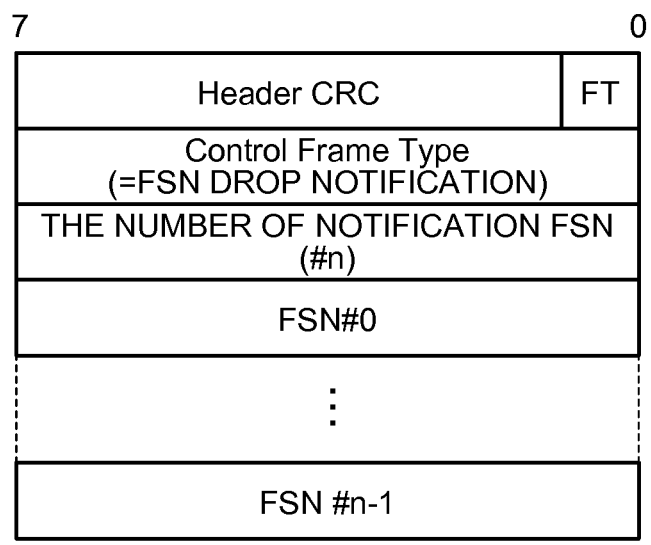
FIG. 10 is a diagram illustrating an example of data structure of an FN frame.

FIG. 10 is a diagram illustrating an example of the data structure of the FN frame. As illustrated in the diagram, the FN frame has header CRC, FT, control frame type, the number of notification FSNs, and FSN #0 to #n−1. "Control frame type" includes information for notifying of drop of an EDCH FP frame (FSN drop), and "the number of notification FSNs" indicates the number of FSNs whose drop is detected (the number of dropped EDCH FP frames). For example, in the case where "n" dropped EDCH FP frames present, the number of notification FSNs is "n". In FSN #0 to FSN #n−1, the number of FSNs associated with the dropped EDCH FP frames are registered.

The FN processing unit 360*a* is means for outputting an FSN notified in an FN frame which is received from the RNC 400 to the EDCH FP generation processing unit 320. The TC processing unit 360b is means for suppressing data communication from the basestation 300 to the RNC 400 by predetermined amount or for a predetermined period when a TC frame (congestion notification) is received from the RNC 400.

Subsequently, the configuration of the RNC 400 will be described. As illustrated in FIG. 9, the RNC 400 has an EDCH-FP processing unit 410 and a control frame generating unit 420. The EDCH-FP processing unit 410 is means for controlling data communication with the basestation 300 and, in the case where an EDCH FP frame is received from the basestation 300, outputs the received EDCH FP frame to an upper-level processing unit.

The EDCH-FP processing unit 410 monitors an FSN included in the EDCH FP frame and, in the case where drop of an FSN is detected, outputs information indicative of the detection of an FNS drop and information of the dropped FSN to the control frame generating unit 420.

The control frame generating unit 420 is means for generating control frames (FN frame and TC frame) on the basis of detection results of the EDCH-FP processing unit 410, and has a TC frame generating unit 420a and an FN frame generating unit 420b.

The TC frame generating unit 420a is means, in the case where information indicating that drop of an FSN is detected is obtained from the EDCH-FP processing unit 410, for generating a TC frame (congestion notification), and transmitting the generated TC frame to the basestation 300.

The FN frame generating unit 420b is means, in the case where information of the dropped FSN is obtained from the EDCH-FP processing unit 410, for generating an FN frame (refer to FIG. 10) including the information of the dropped FSN and transmitting the generated FN frame to the basestation 300.

The FN frame transmitted from the FN frame generating unit 420b is used, for example, by defining a frame obtained by expanding "control frame type" of "control frame" defined in 3GPP. The information of the FSN notified by the TN frame is defined so that it can be notified in the list format.

Figure 11:
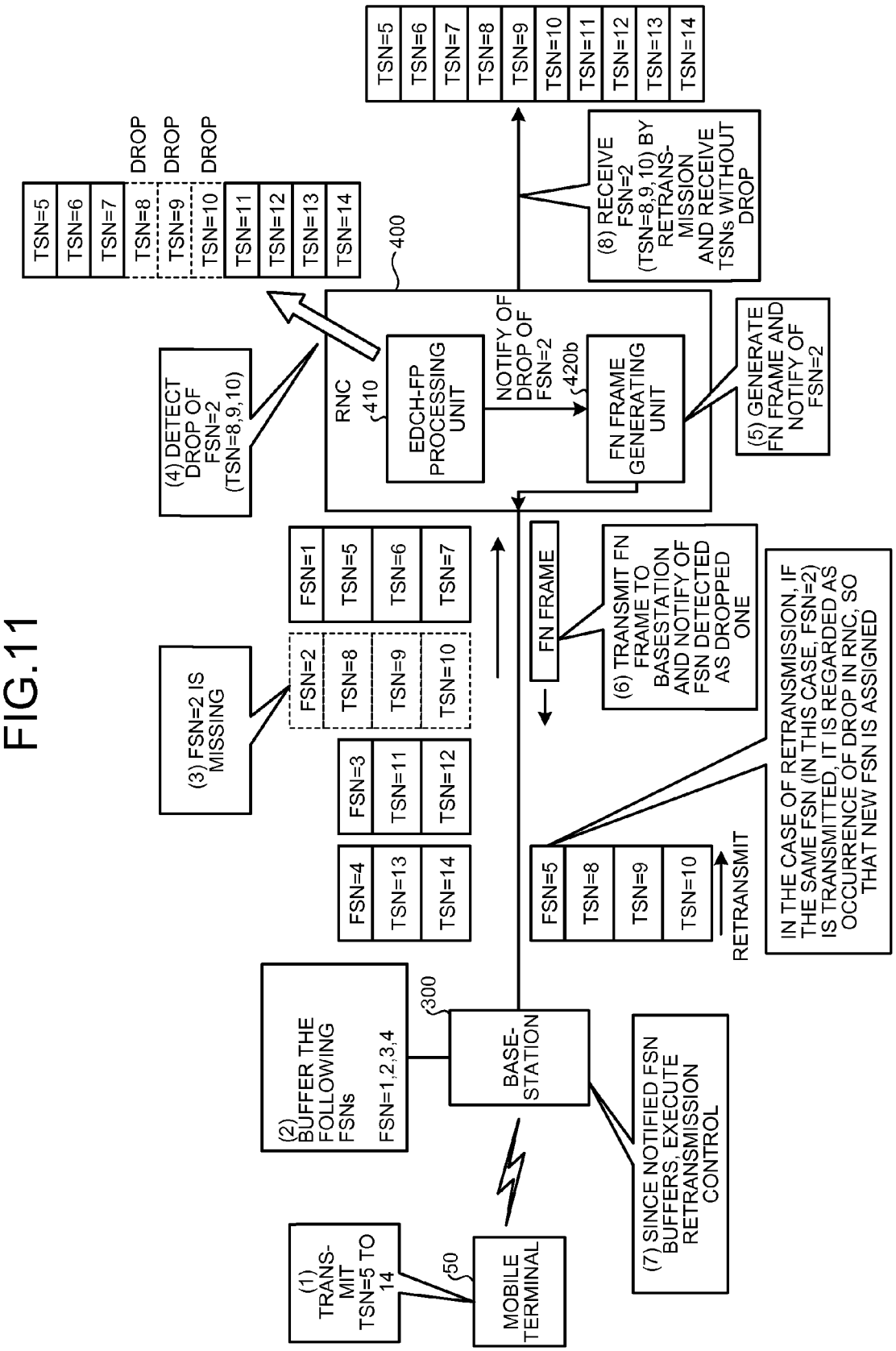
FIG. 11 is a diagram illustrating an operation example of the mobile communication system according to the second embodiment.

Next, an operation example of the mobile communication system according to the second embodiment will be described. FIG. 11 is a diagram illustrating an operation example of the mobile communication system according to the second embodiment. As illustrated in FIG. 11, the mobile terminal 50 transmits frames of TSN=5 to 14 to the basestation 300 (refer to (1) in FIG. 11).

The basestation 300 receives frames of TSN=5 to 14, generates an EDCH FP frame (FSN=1) obtained by multiplexing TSN=5 to 7, an EDCH FP frame (FSN=2) obtained by multiplexing TSN=8 to 10, an EDCH FP frame (FSN=3) obtained by multiplexing TSN=11 and 12, and an EDCH FP frame (FSN=4) obtained by multiplexing TSN=13 and 14, and buffers the generated EDCH FP frames (refer to (2) in FIG. 11).

The basestation 300 transmits the EDCH FP frames (FSN=1 to 4) to the RNC 400. It is assumed that drop of the EDCH FP frame of FSN=2 occurs at this time (refer to (3) in FIG. 11).

The RNC 400 receives the EDCH FP frames from the basestation 300, and the EDCH-FP processing unit 410 detects drop of the FSN on the basis of FSNs included in the EDCH FP frames (refer to (4) in FIG. 11). In this case, FSN=2 (TSN=8, 9, and 10) is not included, so that the EDCH-FP processing unit 410 notifies the FN frame generating unit 420b of the drop of FSN=2.

The FN frame generating unit 420b generates an FN frame and notifies the basestation 300 of FSN=2 (refer to (5) and (6) in FIG. 11). Since the corresponding EDCH FP frame of FSN=2 is stored in a storage unit of the basestation 300, the basestation 300 retransmits an EDCH FP frame of FSN=2 (refer to (7) in FIG. 11). The RNC 400 receives the EDCH FP frame (FSN=2) retransmitted from the basestation 300, thereby repairing the frame drop (refer to (8) in FIG. 11).

Figure 12:
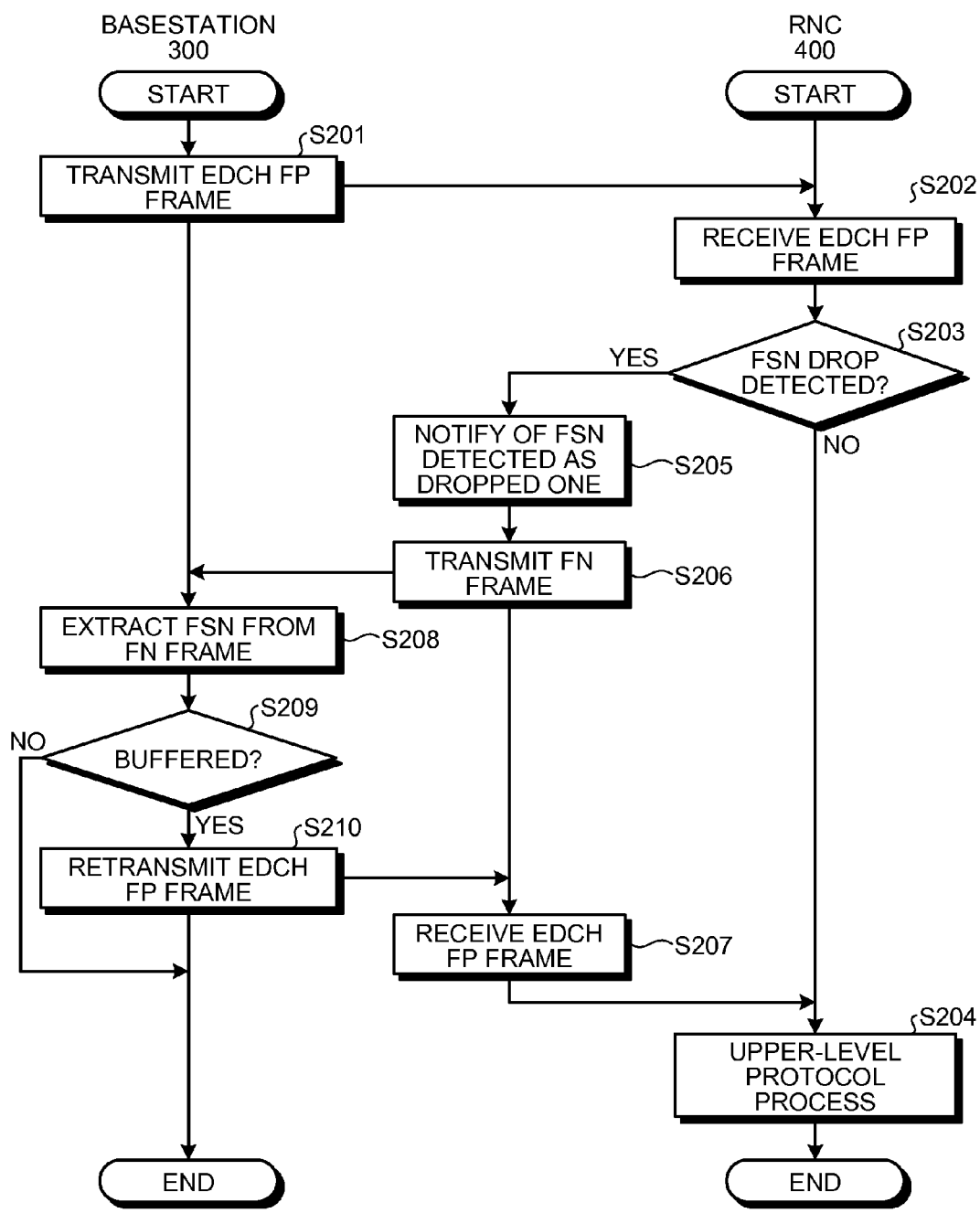
FIG. 12 is a flowchart illustrating a procedure of the mobile communication system according to the second embodiment.

Next, the procedure of the mobile communication system according to the second embodiment will be described. FIG. 12 is a flowchart illustrating the procedure of the mobile communication system according to the second embodiment. As illustrated in the diagram, the basestation 300 transmits the EDCH FP frame to the RNC 400 (step S201), and the RNC 400 receives the EDCH FP frame (step S202). In the case where no drop of an FSN is detected (No in step S203), the RNC 400 executes an upper-level protocol process (step S204).

On the other hand, in the case where drop of an FSN is detected (Yes in step S203), the FSN detected as dropped one is notified to the FN frame generating unit 420b (step S205), and the FN frame is transmitted to the basestation 300 (step S206).

The basestation 300 extracts an FSN from an FN frame (step S208) and determines whether the FSN is buffered. In the case where the FSN is not buffered (No in step S209), the basestation 300 finishes the process.

On the other hand, in the case where the FSN is buffered (Yes in step S209), the basestation 300 retransmits the FP frame to the RNC 400 (step S210). The RNC 400 receives the EDCH FP frame (step S207) and shifts to step S204.

As described above, in the mobile communication system according to the second embodiment, in the case where drop of an EDCH FP frame occurs in the Iub/Iur (between the basestation 300 and the RNC 400), the RNC 400 transmits an FN frame to the basestation 300, thereby executing retransmission of the EDCH FP frame between the RNC and the basestation to repair the drop. Therefore, an effect that the use efficiency of the wireless band improves is obtained. Simultaneously, retransmission traffic is performed not via a wireless interval having large propagation delay. Consequently, an effect such that the roundtrip time becomes shorter as compared with that in the case of retransmission performed in the RLC layer is obtained.

In the mobile communication system according to the second embodiment, when drop of an FSN occurs, in principle, the corresponding basestation certainly has the dropped EDCH FP frame. Consequently, by performing the retransmission control only on the corresponding basestation, the dropped EDCH FP frame can be obtained, and the burden on the RNC 400 can be also lessened.

[c] Third Embodiment

Next, the outline and characteristic of a mobile communication system according to a third embodiment will be described. The mobile communication system according to the third embodiment switches a retransmission control method on the basis of the number of basestations connected to the RNC.

Concretely, in the case where drop of a TSN is detected in a state where a plurality of basestations are connected to an RNC, by using the method of the foregoing first embodiment, a TN frame is generated, and a frame which is dropped is repaired. On the other hand, in the case where drop of an FSN is detected in a state where a single basestation is connected to an RNC, by using the method of the foregoing second embodiment, a TN frame is generated, and a FN frame which is dropped is generated and a frame which is dropped is repaired.

As described above, the mobile communication system according to the third embodiment switches the frame repairing method on the basis of a connection state between the RNC and the basestation (in the case where an RNC is connected to a plurality of basestations in order to improve probability of repairing a dropped frame between the basestation and the RNC, a TN frame is transmitted to the basestations and, in the case where the RNC is connected to a single basestation, an FN frame is transmitted to the basestation which certainly holds the dropped frame). Therefore, a dropped frame can be repaired with high efficiency.

Figure 13:
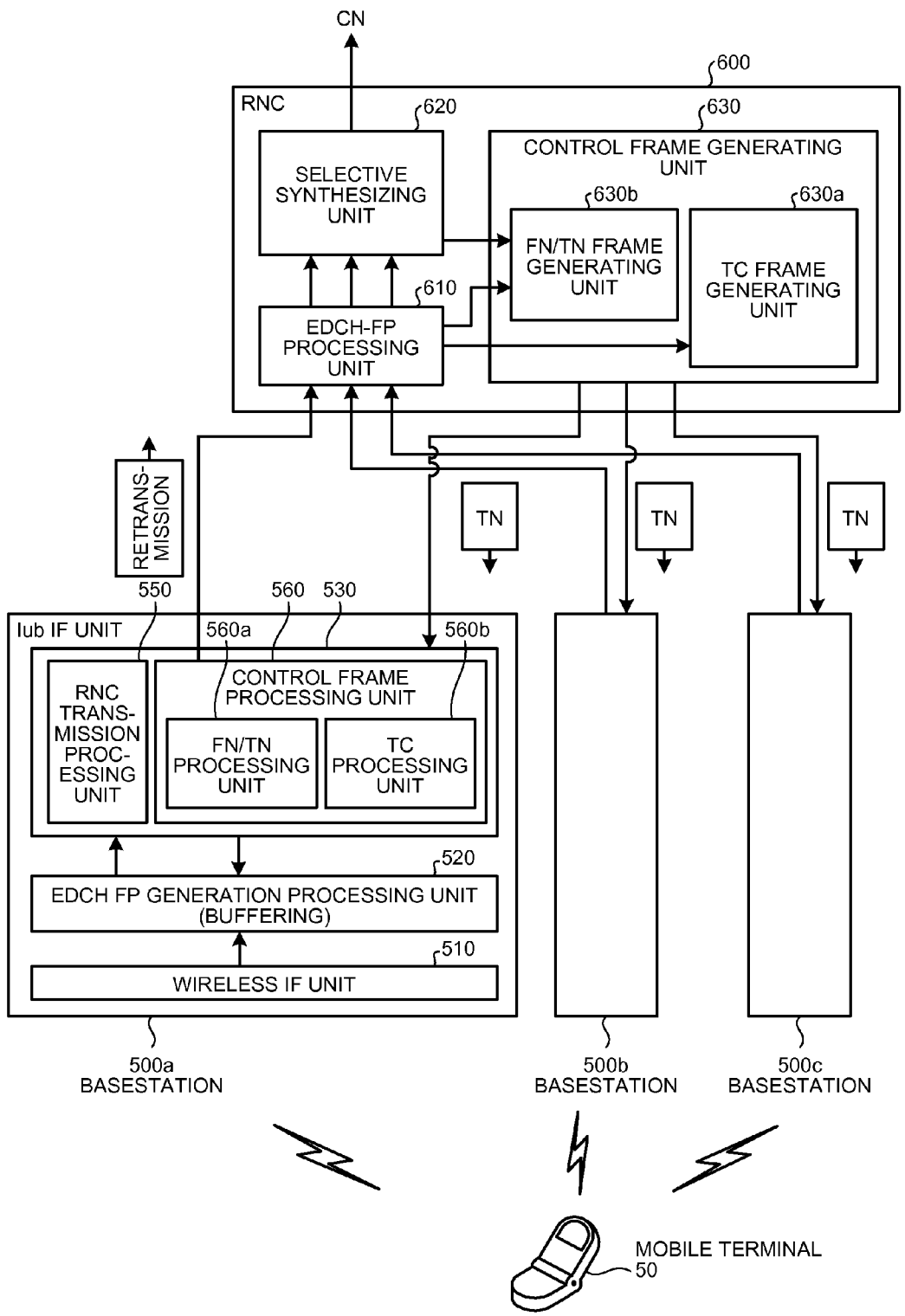
FIG. 13 is a functional block diagram illustrating the configuration of a basestation and an RNC in a third embodiment.

Next, the configuration of basestations 500a to 500c and an RNC 600 according to the third embodiment will be described. FIG. 13 is a functional block diagram illustrating the configuration of the basestations 500a to 500c and the RNC 600 according to the third embodiment. Since the configuration of the basestations 500b and 500c is similar to that of the basestation 500a, the description will not be repeated.

First, the configuration of the basestation 500a will be described. The basestation 500a has a wireless IF unit 510, an EDCH FP generation processing unit 520, and an Iub IF unit 530. Since the other components are similar to those of a known basestation, their description will not be given.

The wireless IF unit 510 is means for controlling wireless data communication with the mobile terminal 50. In the case where a frame (MAC-es PDU) is received from the mobile terminal 50, the wireless IF unit 510 outputs the received frame to the EDCH FP generation processing unit 520. It is assumed that the TSN is assigned as a sequence number to each of the frames. In the case where a frame addressed to the mobile terminal 50 is obtained, the wireless IF unit 510 transmits the obtained frame to the mobile terminal 50.

The EDCH FP generation processing unit 520 is means for generating an EDCH FP frame obtained by multiplexing frames in the case where a frame is obtained from the wireless IF unit 510. In the case of generating an EDCH FP frame, the EDCH FP generation processing unit 520 gives the FSN (for the data structure of the EDCH FP frame, refer to FIG. 19).

The EDCH FP generation processing unit 520 stores the generated EDCH FP frame in its buffer and outputs the EDCH FP frame to the Iub IF unit 530. The EDCH FP generation processing unit 520 stores the EDCH FP frame until predetermined time elapses since the EDCH FP frame is stored. Alternately, the EDCH FP generation processing unit 520 may store the EDCH FP frame up to predetermined capacity and, when there is no remaining capacity in the buffer, sequentially erase the EDCH FP frames from the oldest one.

When the TSN is obtained from an FN/TN processing unit 560a (explanation of FN/TN processing unit 560a will be described later), the EDCH FP generation processing unit 520 compares the obtained TSN with a TSN included in an EDCH FP frame stored in its buffer to detect the matching TSN, and detects each frame (MAC-es PDU) associated with the detected TSN.

The EDCH FP generation processing unit 520 generates an EDCH FP frame obtained by multiplexing detected frames and outputs the generated EDCH FP frame to an RNC transmission processing unit 550 so as to retransmit it to the RNC 600.

On the other hand, when the FSN is obtained from the FN/TN processing unit 560a, the EDCH FP generation processing unit 520 compares the obtained FSN with an FSN included in an EDCH FP frame stored in its buffer to detect the matching FSN, and detects an EDCH FP frame associated with the detected FSN. The EDCH FP generation processing unit 520 outputs the detected EDCH FP frame to the RNC transmission processing unit 550 so as to retransmit it to the RNC 600.

The Iub IF unit 530 is means for controlling data communication with the RNC 600. The Iub IF unit 530 has the RNC transmission processing unit 550 and a control frame processing unit 560.

The RNC transmission processing unit 550 is means for transmitting the obtained EDCH FP frame to the RNC 600 when the EDCH FP frame is obtained from the EDCH FP generation processing unit 520.

The control frame processing unit 560 is means for executing various processes on the basis of control frames (TN frame, FN frame, and TC frame) transmitted from the RNC 600 and has the FN/TN processing unit 560a and a TC processing unit 560b.

The TN frame, the FN frame, and TC frame are similar to those described in the first and second embodiments.

The FN/TN processing unit 560a is means, in the case where an FN frame is received from the RNC 600, for outputting an FSN notified in the FN frame to the EDCH FP generation processing unit 520 and, in the case where a TN frame is received from the RNC 600, outputting a TSN notified by the TN frame to the EDCH FP generation processing unit 520.

The TC processing unit 560b is means for suppressing data communication from the basestation 500 to the RNC 600 by predetermined amount or for a predetermined period when a TC frame (congestion notification) is received from the RNC 600.

Subsequently, the configuration of the RNC 600 will be described. As illustrated in FIG. 13, the RNC 600 has an EDCH-FP processing unit 610, a selective synthesizing unit 620, and a control frame generating unit 630.

The EDCH-FP processing unit 610 is means for controlling data communication with the basestations 500a to 500c and, in the case where EDCH FP frames are received from the basestations 500a to 500c, outputs the received EDCH FP frame to the selective synthesizing unit 620.

The EDCH-FP processing unit 610 monitors an FSN included in the EDCH FP frame and, in the case where drop of an FSN is detected, outputs information indicative of the detection of an FNS drop and the FSN directly to the control frame generating unit 630.

The selective synthesizing unit 620 is means, in the case of obtaining EDCH FP frames, for synthesizing each frame by re-ordering the frames associated with TSNs included in the EDCH FP frames on the basis of the TSNs. The selective synthesizing unit 620 outputs the synthesized frame to the CN.

When connected to a plurality of basestations, the selective synthesizing unit 620 determines whether there is drop of a TSNon the basis of the TSNs associated with the frames and, in the case where drop of a TSN is detected, outputs the information of the dropped TSN to the control frame generating unit 630.

The control frame generating unit 630 is means for generating control frames (TN frame, FN frame, and TC frame) on the basis of detection results of the EDCH-FP processing unit 610 and the selective synthesizing unit 620, and has a TC frame generating unit 630a and an FN/TN frame generating unit 630b.

The TC frame generating unit 630a is means, in the case where information indicating that drop of an FSN is detected is obtained from the EDCH-FP processing unit 610, for generating a TC frame (congestion notification) and transmitting the generated TC frame to the basestations 500a to 500c.

The FN/TN frame generating unit 630b is means, in the case where information of the dropped TSN is obtained from the selective synthesizing unit 620, for generating a TN frame (refer to FIG. 5) including the information of the dropped TSN and transmitting the generated TN frame to the basestations 500a to 500c.

On the other hand, when the RNC 600 is connected to a single basestation (for example, only the basestation 500a), in the case where information of a dropped FSN is obtained from the EDCH-FP processing unit 610, an FN frame (refer to FIG. 10) including the information of the dropped FSN is generated, and the generated FN frame is transmitted to the basestation 500a.

As described above, the mobile communication system according to the third embodiment switches the frame repairing method on the basis of a connection state between the RNC 600 and the basestations 500a to 500c (in the case where the RNC is connected to a plurality of basestations in order to improve probability of repairing a dropped frame between the basestations and the RNC, a TN frame is transmitted to each of the basestations and, in the case where the RNC is connected to a single basestation, an FN frame is transmitted to the basestation which certainly holds the dropped frame). Therefore, a dropped frame can be repaired with high efficiency.

All or part of the processes described as processes automatically performed in the processes described in the first to third embodiments can be performed manually, or all or part of the processes described as processes performed manually can be automatically performed by a known method. Information including the process procedures, control procedures, concrete names, various data, and parameters described and illustrated in the foregoing document and the drawings can be arbitrarily changed unless otherwise specified.

The components of the basestations 100a to 100c, 300, 500a to 500c and the RNCs 200, 400, and 600 illustrated in FIGS. 4, 9, and 13 are function concept and are not always required to be physically constructed as illustrated in the drawings. That is, concrete forms of distribution and integration of the devices are not limited to those illustrated in the diagrams and all or part of them can be functionally or physically distributed/integrated in an arbitrary unit in accordance with various loads, use state, and the like. Further, all or part of the process functions executed in the devices is realized by a CPU and a program analyzed and executed by the CPU or can be realized as hardware by a wired logic.

Figure 14:
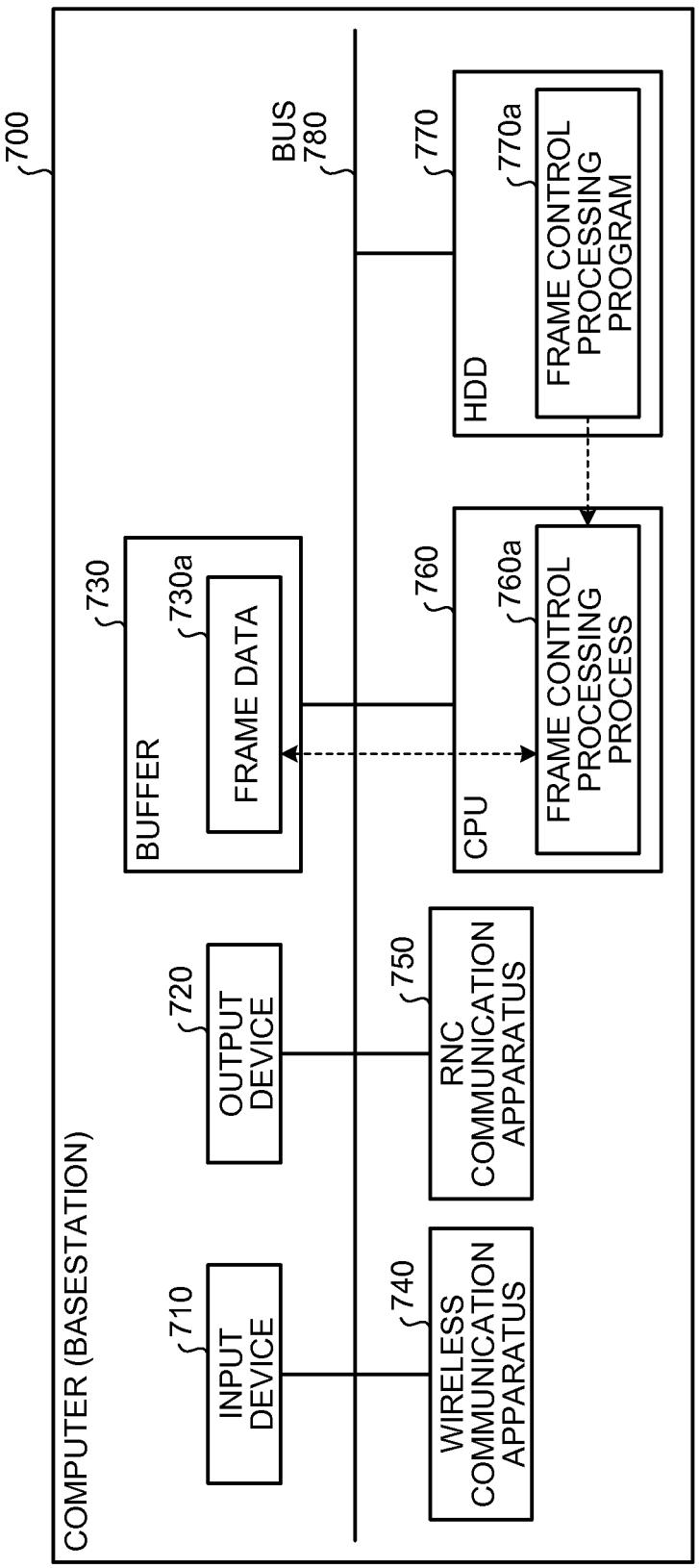
FIG. 14 is a diagram illustrating hardware configuration of a computer serving as a basestation corresponding to the first to third embodiments.
Figure 15:
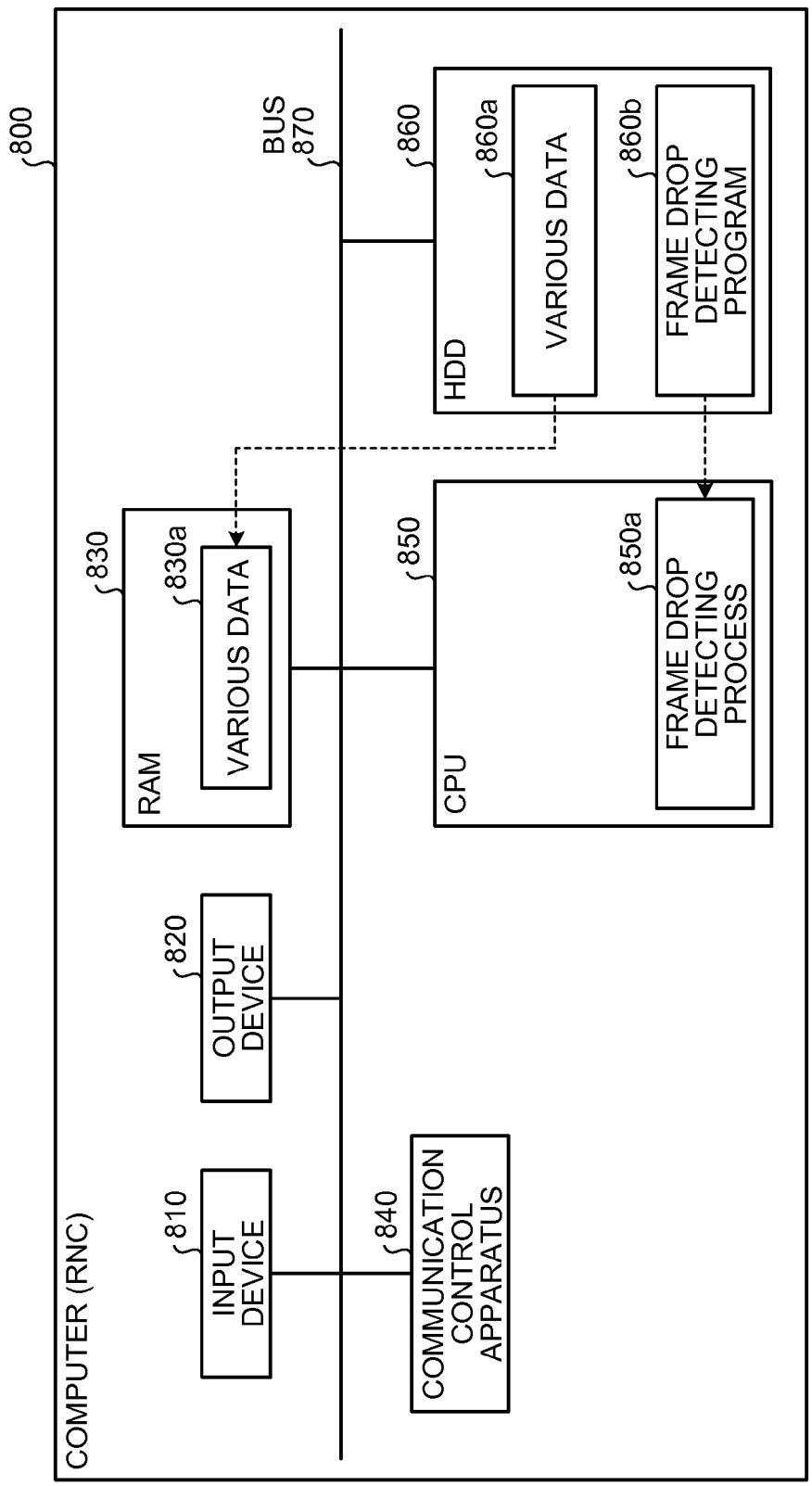
FIG. 15 is a diagram illustrating hardware configuration of a computer serving as an RNC corresponding to the first to third embodiments.
Figure 16:
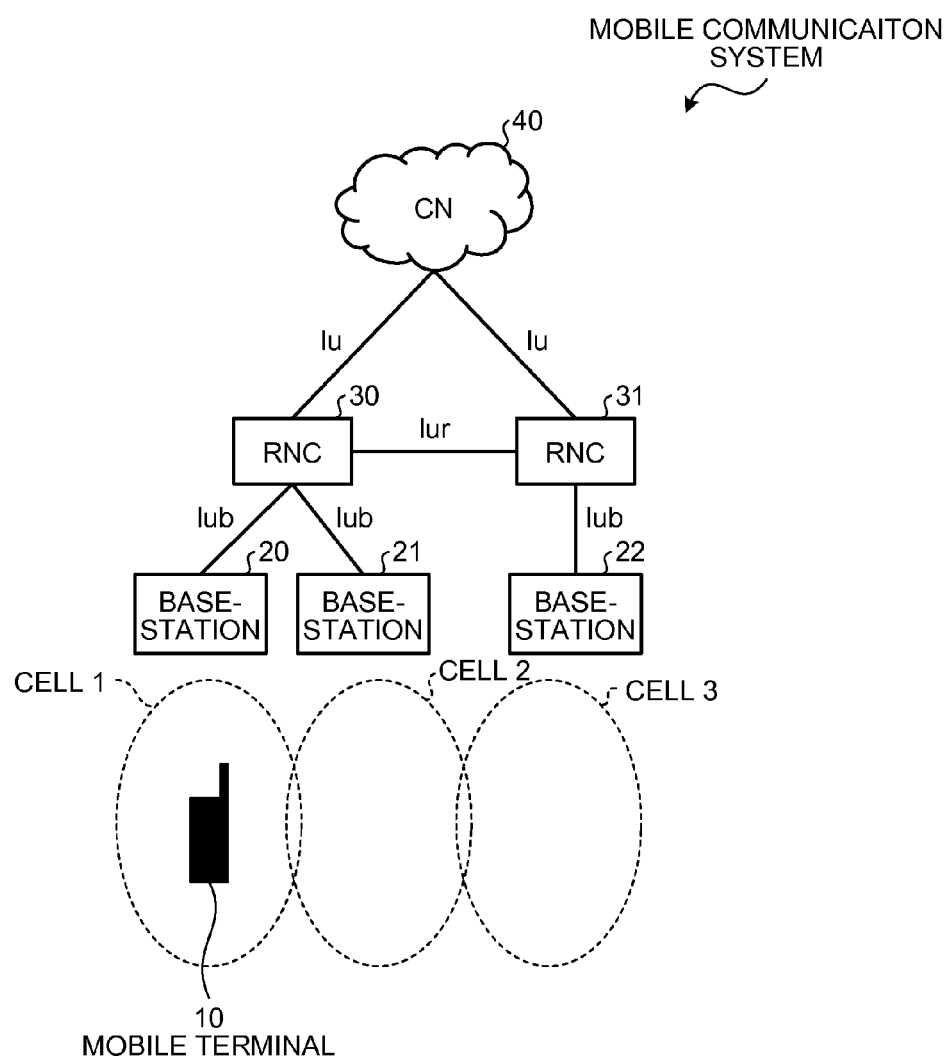
FIG. 16 is a diagram illustrating the configuration of a conventional mobile communication system.
Figure 17:
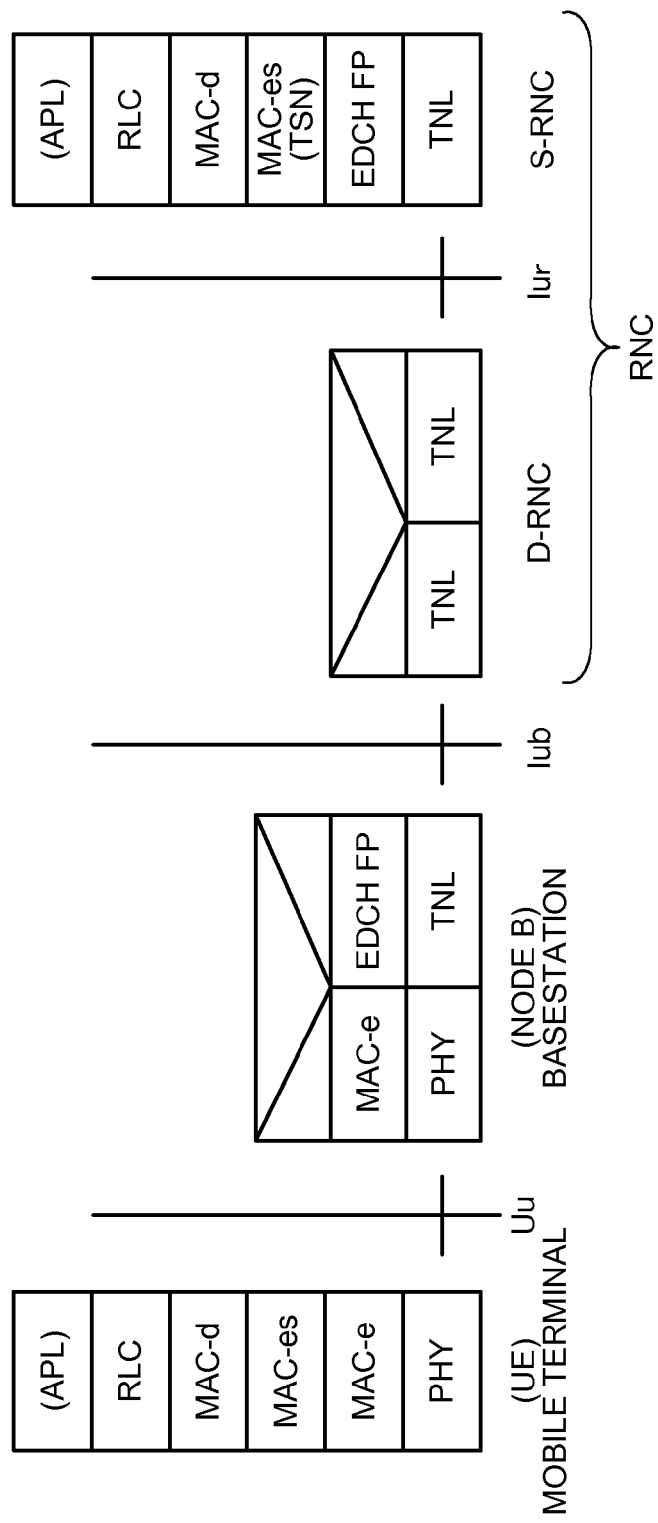
FIG. 17 is a diagram for explaining a protocol model of the HSUPA.

FIG. 14 is a diagram (an example) illustrating hardware configuration of a computer 700 serving as a basestation corresponding to the first to third embodiments, and FIG. 15 is a diagram (an example) illustrating hardware configuration of a computer 800 serving as an RNC corresponding to the first to third embodiments.

As illustrated in FIG. 14, the computer (basestation) 700 has an input device 710, an output device 720 such as a display, a buffer 730, a wireless communication apparatus 740 for executing data communication with a mobile terminal, an RNC communication apparatus 750 for executing data communication with an RNC, a Central Processing Unit (CPU) 760, and a Hard Disk Drive (HDD) 770 which are connected via a bus 780.

The CPU 760 reads and executes a frame control processing program 770a stored in the HDD 770 to start a frame control processing process 760a. The frame control processing process 760a corresponds to the EDCH FP generation processing unit and the control frame processing unit described in the first to third embodiments. The CPU stores a frame received from a mobile terminal as frame data 730a in the buffer 730 and, as necessary, transmits the frame data 730a stored in the buffer 730 to the RNC.

As illustrated in FIG. 15, the computer (RNC) 800 has an input device 810, an output device 820 such as a display, a Random Access Memory (RAM) 830, a communication control apparatus 840 for executing data communication with a basestation, a Core Network (CN), and the like, a CPU 850, and an HDD 860 which are connected via a bus 870.

In the HDD 860, a frame drop detecting program 860b displaying a function similar to that of the RNC described in the first to third embodiments is stored. The CPU 850 reads and executes the frame drop detecting program 860b to start a frame drop detecting process 850a. The frame drop detecting process 850a corresponds to the EDCH-FP processing unit, the selective synthesizing unit, and the control frame generating unit described in the first to third embodiments.

The HDD 860 stores various data 860a used by the RNC. The CPU 850 reads the various data 860a stored in the HDD 860, stores it in the RAM 830, and detects drop of a TSN or FNS by using the various data 830a stored in the RAM 830.

The frame control processing program 770a illustrated in FIG. 14 and the frame drop detecting program 860b illustrated in FIG. 15 do not always have to be stored in the HDDs 770 and 860 from the beginning. For example, the frame control processing program 770a and the frame drop detecting program 860b may be stored in a "portable physical medium" such as a flexible disk (FD), a CD-ROM, a DVD disk, a magnetooptic disk, an IC card which is inserted in a computer, a "fixed physical medium" such as a hard disk drive (HDD) provided on the inside and outside, "another computer (or server)" connected to the computer via a public line, the Internet, LAN, WAN, or the like, or the like. The computer may read and execute the frame control processing program 770a and the frame drop detecting program 860b from any of them.

With the control apparatus, in the case where drop of data occurs between the control apparatus and a basestation, by retransmitting data stored in the basestation, drop of the data is repaired. Consequently, an effect of improving use efficiency of the wireless band is obtained. Since the retransmission is performed without using the mobile terminal, the roundtrip can be made short.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A control apparatus comprising:
a detecting unit that, when receiving data transmitted from a mobile terminal device via at least one wireless communication apparatus including a buffer that stores the data up to at least one of a predetermined capacity and a predetermined time, detects drop of the data on the basis of sequence numbers included in the data and associated with predetermined data; and
a data obtaining unit that, when drop of data is detected by the detecting unit, selects at least one sequence number corresponding to the dropped data, wherein, in the case where the data are transmitted from the mobile terminal device via a single wireless communication apparatus of the at least one wireless communication apparatus, the at least one sequence number is a frame sequence number set by the single wireless communication apparatus for a frame comprising multiple packets transmitted from the mobile terminal device and, in the case where the data are transmitted from the mobile terminal device via a plurality of wireless communication apparatuses of the at least one wireless communication apparatus, the at least one sequence number is a sequence number set by the mobile terminal device for each packet transmitted from the mobile terminal device, and transmits the at least one sequence number corresponding to the dropped data to the at least one wireless communication apparatus and obtains the dropped data from the buffer of only one of the at least one wireless communication apparatus.

2. A wireless communication apparatus comprising:

a storing unit that stores data transmitted from a mobile terminal device up to at least one of a predetermined capacity and a predetermined time; and a transmitting unit that, when receiving a sequence number corresponding to dropped data from a control apparatus which receives the data from the wireless communication apparatus, detects data corresponding to the sequence number from the storing unit, and transmits the detected data to the control apparatus, wherein a data obtaining unit of the control apparatus selects at least one sequence number corresponding to the dropped data, wherein, in the case where the data are transmitted from the mobile terminal device via a single wireless communication apparatus, the at least one sequence number is a frame sequence number set by the single wireless communication apparatus for a frame comprising multiple packets transmitted from the mobile terminal device and, in the case where the data are transmitted from the mobile terminal device via a plurality of wireless communication apparatuses, the at least one sequence number is a sequence number set by the mobile terminal device for each packet transmitted from the mobile terminal device, and transmits the at least one sequence number to the wireless communication apparatus, being one of a plurality of wireless communication apparatuses in the case where the control apparatus is connected to the plurality of wireless communication apparatuses, or transmits the sequence number to the wireless communication apparatus when the wireless communication apparatus holds the dropped data in the case where the control apparatus is connected to a single wireless communication apparatus; and wherein the transmitting unit of the wireless communication apparatus, when the at least one sequence number is a frame sequence number, retransmits the frame corresponding to the at least one sequence number and, when the at least one sequence number is a sequence number set by the mobile terminal device, generates a new frame with a new frame sequence number including only the packets identified by the at least one sequence number and transmits the new frame.

3. A communication system comprising:

at least one wireless communication apparatus that performs wireless communication with a mobile terminal device; and a control apparatus that executes data communication with the mobile terminal device via the at least one wireless communication apparatus, wherein the at least one wireless communication apparatus includes a storing unit that stores data transmitted from the mobile terminal device up to at least one of a predetermined capacity and a predetermined time, and the control apparatus includes a detecting unit that, when receiving data from the mobile terminal device via the at least one wireless communication apparatus, detects drop of data on the basis of sequence numbers included in the data; and a data obtaining unit that, when drop of data is detected by the detecting unit, selects at least one sequence number corresponding to the dropped data, wherein, in the case where the data are transmitted from the mobile terminal device via a single wireless communication apparatus of the at least one wireless communication apparatus, the at least one sequence number is a frame sequence number set by the single wireless communication apparatus for a frame comprising multiple packets transmitted from the mobile terminal device and, in the case where the data are transmitted from the mobile terminal device via a plurality of wireless communication apparatuses of the at least one wireless communication apparatus, the at least one sequence number is a sequence number set by the mobile terminal device for each packet transmitted from the mobile terminal device, and transmits the at least one sequence number corresponding to the dropped data to the at least one wireless communication apparatus and obtains the dropped data from the storing unit of only one of the at least one wireless communication apparatus.

4. A control method for a communication system that includes at least one wireless communication apparatus performing wireless communication with a mobile terminal device and a control apparatus executing data communication with the mobile terminal device via the at least one wireless communication apparatus, the control method comprising:

storing, by the at least one wireless communication apparatus, data transmitted from the mobile terminal device in a buffer up to at least one of a predetermined capacity and a predetermined time; and detecting, by the control apparatus, when data is received from the mobile terminal device via the at least one wireless communication apparatus, drop of data on the basis of sequence numbers included in the data; and selecting, when drop of data is detected, at least one sequence number corresponding to the dropped data, wherein, in the case where the data are transmitted from the mobile terminal device via a single wireless communication apparatus of the at least one wireless communication apparatus, the at least one sequence number is a frame sequence number set by the single wireless communication apparatus for a frame comprising multiple packets transmitted from the mobile terminal device and, in the case where the data are transmitted from the mobile terminal device via a plurality of wireless communication apparatuses of the at least one wireless communication apparatus, the at least one sequence number is a sequence number set by the mobile terminal device for each packet transmitted from the mobile terminal device, and transmitting the at least one sequence number corresponding to the dropped data to the at least one wireless communication apparatus, and obtaining the dropped data from the buffer of only one of the at least one wireless communication apparatus.

5. A non-transitory computer readable storage medium having stored therein a control program for causing a computer to execute:

detecting, when receiving data transmitted from a mobile terminal device via at least one wireless communication apparatus including a buffer that stores the data up to at least one of a predetermined capacity and a predetermined time, drop of the data on the basis of sequence numbers included in the data and associated with predetermined data; and selecting, when drop of data is detected by the detecting procedure, at least one sequence number corresponding to the dropped data, wherein, in the case where the data are transmitted from the mobile terminal device via a single wireless communication apparatus of the at least one wireless communication apparatus, the at least one sequence number is a frame sequence number set by the single wireless communication apparatus for a frame comprising multiple packets transmitted from the mobile terminal device and, in the case where the data are transmitted from the mobile terminal device via a plurality of wireless communication apparatuses of the at least one wireless communication apparatus, the at least one sequence number is a sequence number set by the mobile terminal device for each packet transmitted from the mobile terminal device, and transmitting the at least one sequence number corresponding to the dropped data to the at least one wireless communication apparatus, and obtaining the dropped data from the buffer of only one of the at least one wireless communication apparatus.

6. A non-transitory computer readable storage medium having stored therein a control program for causing a computer to execute:

storing data transmitted from a mobile terminal device to a storing device up to at least one of a predetermined capacity and a predetermined time;

detecting, when a sequence number corresponding to dropped data is received from a control apparatus which receives the data from a wireless communication apparatus, data corresponding to the sequence number from the storing apparatus, and transmitting the detected data to the control apparatus; and selecting, by a data obtaining unit of the control apparatus, at least one sequence number corresponding to the dropped data, wherein, in the case where the data are transmitted from the mobile terminal device via a single wireless communication apparatus, the at least one sequence number is a frame sequence number set by the single wireless communication apparatus for a frame comprising multiple packets transmitted from the mobile terminal device and, in the case where the data are transmitted from the mobile terminal device via a plurality of wireless communication apparatuses, the at least one sequence number is a sequence number set by the mobile terminal device for each packet transmitted from the mobile terminal device, and transmitting the at least one sequence number to the wireless communication apparatus, being one of a plurality of wireless communication apparatuses in the case where the control apparatus is connected to the plurality of wireless communication apparatuses, or transmitting, by the data obtaining unit of the control apparatus, the sequence number to the wireless communication apparatus when the wireless communication apparatus holds the dropped data in the case where the control apparatus is connected to a single wireless communication apparatus; and when the at least one sequence number is a frame sequence number, retransmitting the frame corresponding to the at least one sequence number and, when the at least one sequence number is a sequence number set by the mobile terminal device, generating a new frame with a new frame sequence number including only the packets identified by the at least one sequence number and transmitting the new frame.

* * * * *